United States Patent [19]
Ishigaki

[11] Patent Number: 6,072,470
[45] Date of Patent: *Jun. 6, 2000

[54] REMOTE CONTROL APPARATUS

[75] Inventor: Masanori Ishigaki, Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/906,105

[22] Filed: Aug. 5, 1997

[30] Foreign Application Priority Data

Aug. 14, 1996 [JP] Japan .................................. P08-231260

[51] Int. Cl.[7] .................................................. G09F 5/08
[52] U.S. Cl. ............................ 345/158; 345/169; 348/734
[58] Field of Search ..................................... 345/157, 158, 345/163, 167, 169, 173; 348/734

[56] References Cited

U.S. PATENT DOCUMENTS

| | | | |
|---|---|---|---|
| 5,450,079 | 9/1995 | Dunaway | 345/169 |
| 5,545,857 | 8/1996 | Lee et al. | 345/173 |
| 5,594,509 | 1/1997 | Florin et al. | 348/734 |
| 5,668,574 | 9/1997 | Jarlance-Huang | 345/158 |
| 5,710,605 | 1/1998 | Nelson | 348/734 |
| 5,724,106 | 3/1998 | Autry et al. | 345/161 |
| 5,764,179 | 6/1998 | Tsurumoto | 345/173 |

FOREIGN PATENT DOCUMENTS

| | | | |
|---|---|---|---|
| 93108257A | 4/1993 | Japan | G06F 3/033 |
| 94214696A | 8/1994 | Japan | G06F 3/02 |

*Primary Examiner*—Regina Liang
*Attorney, Agent, or Firm*—Jay H. Maioli

[57] ABSTRACT

A remote control apparatus for a television receiver and other electronic appliances, wherein a tablet is employed so as to input positional information and a command. The remote control apparatus is arranged by a tablet, a command converting unit for producing command data corresponding to X-coordinate data and Y-coordinate data supplied from the tablet in a command mode, and a data producing unit for producing input positional information in response to the X-coordinate data and the Y-coordinate data supplied from the tablet in a tablet mode. This remote control apparatus is further constructed of a tablet switching key for switching the command mode and the tablet mode, a transmitting unit for transmitting transmission signals produced by modulating the command data and the positional data, and also a control unit for causing the transmitting unit to transmit the positional information as the transmission signal during the tablet mode, and also to transmit the command data as the transmission signal during the command mode.

4 Claims, 15 Drawing Sheets

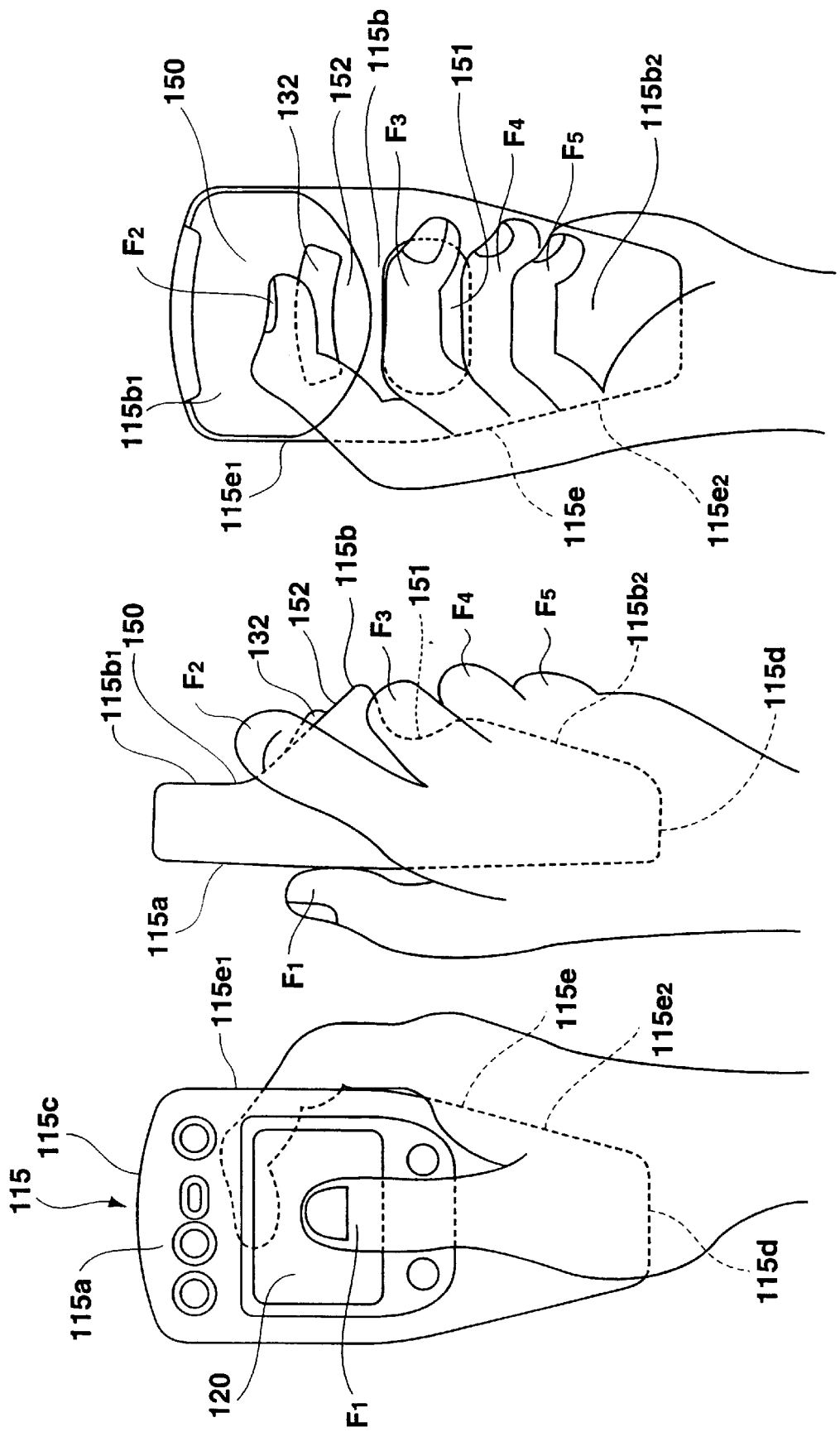

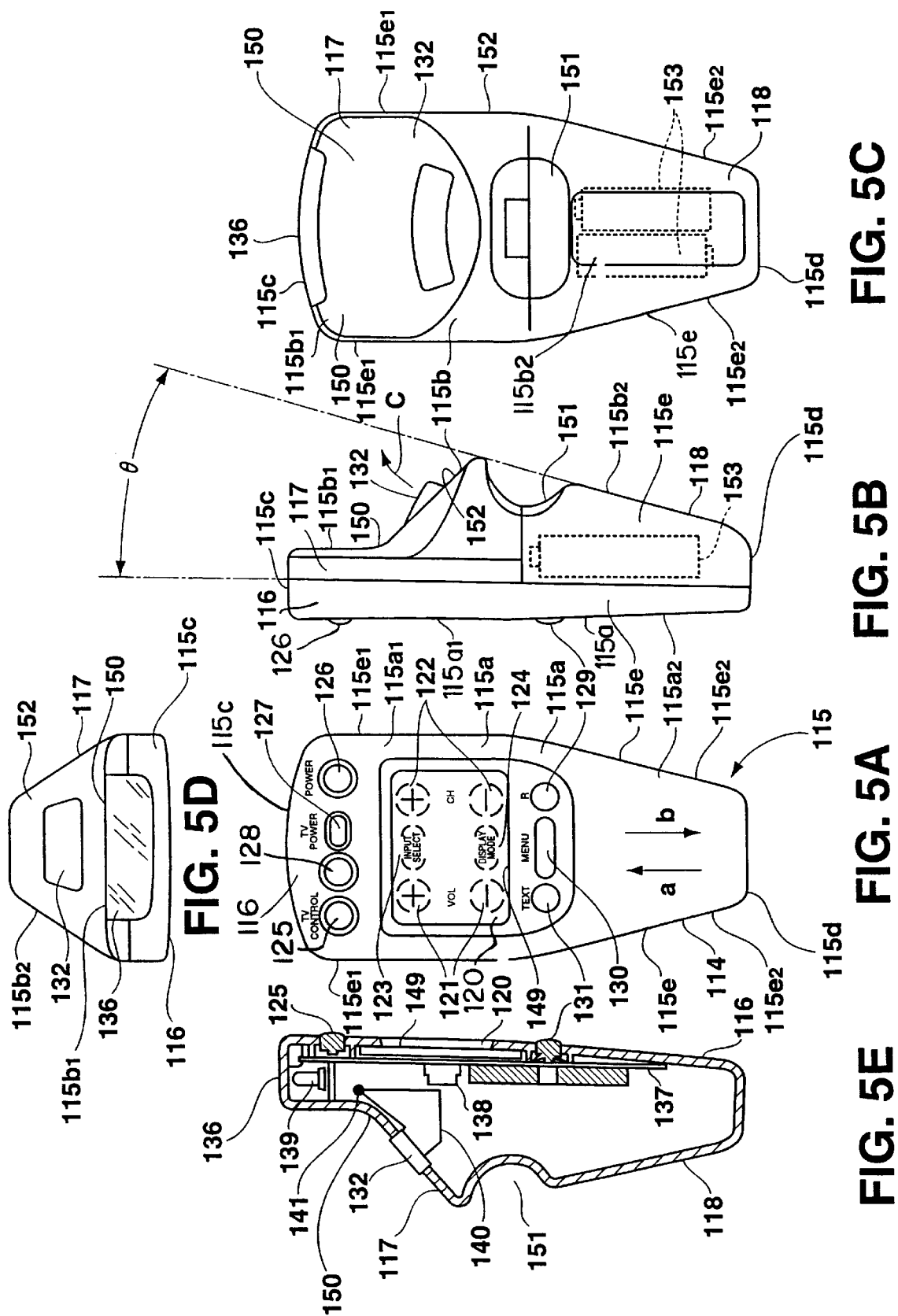

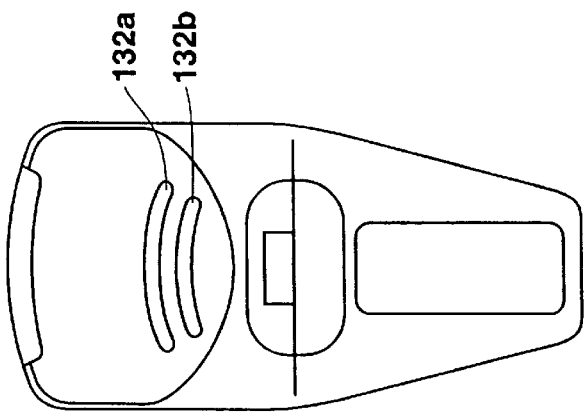
FIG. 6C
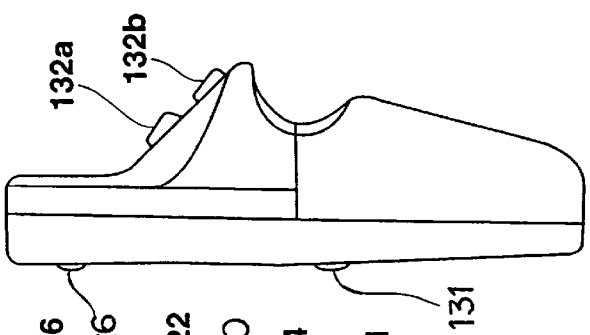
FIG. 6B
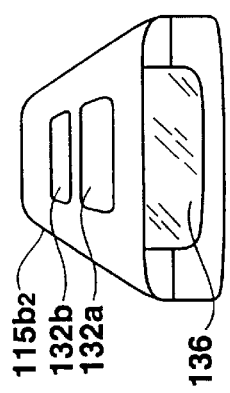
FIG. 6D
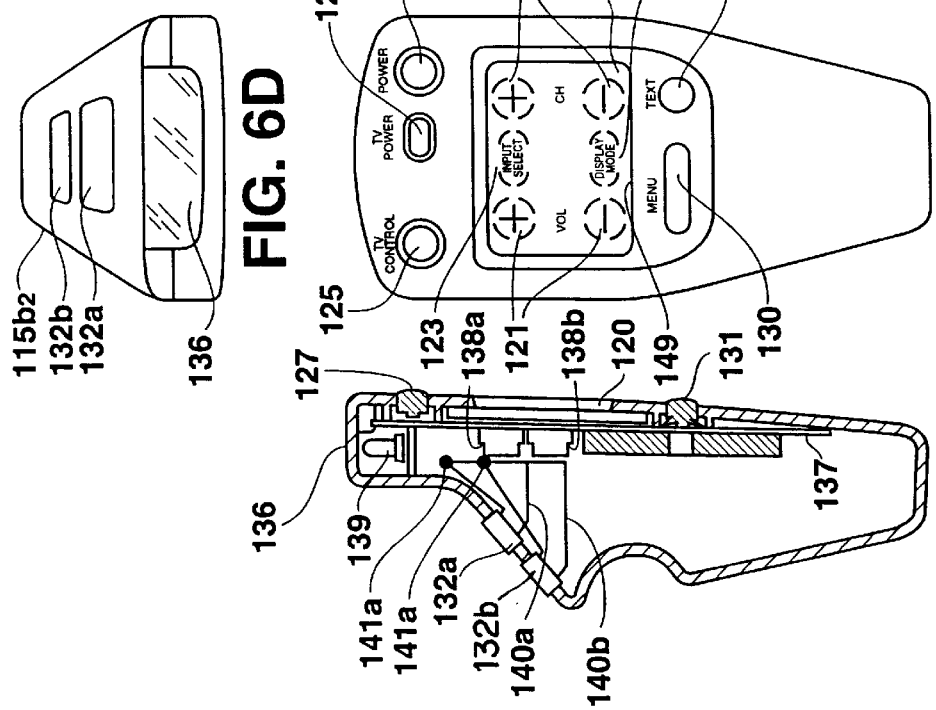
FIG. 6A
FIG. 6E

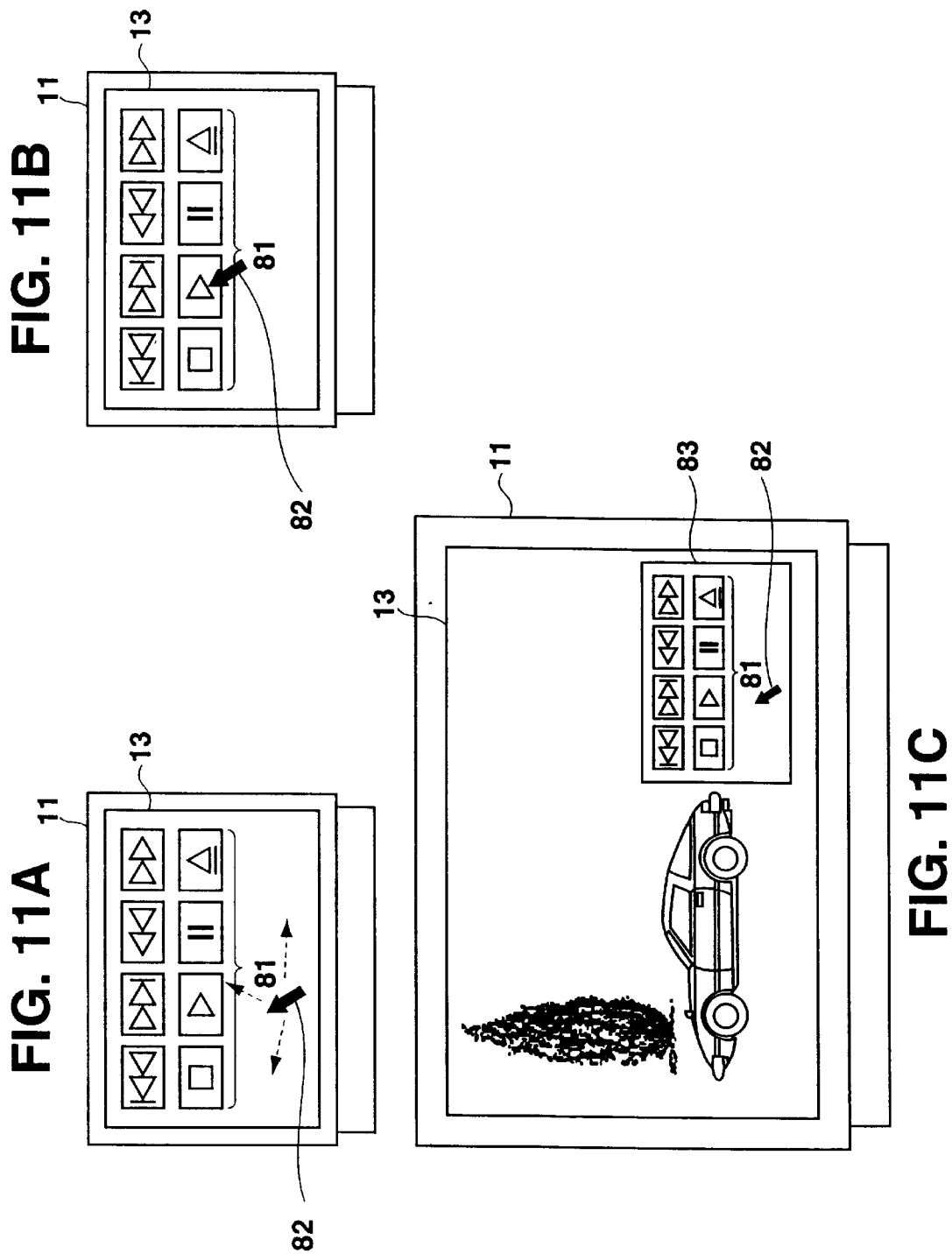

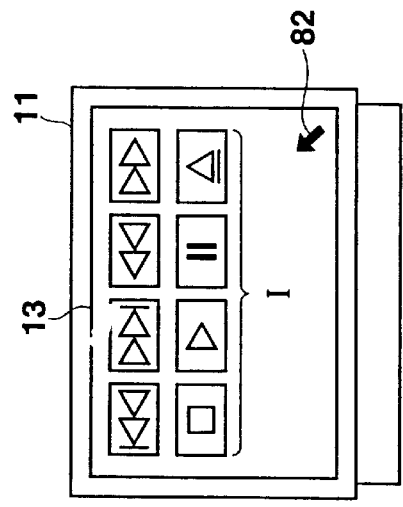
FIG. 12A
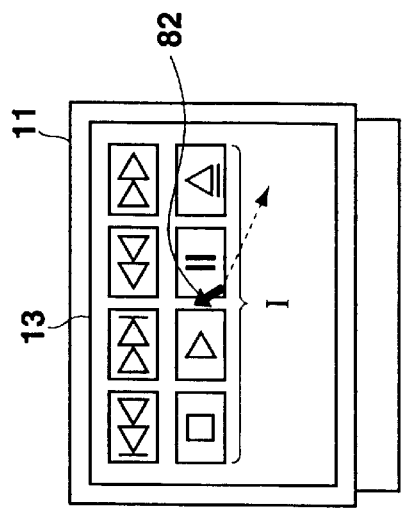
FIG. 12B
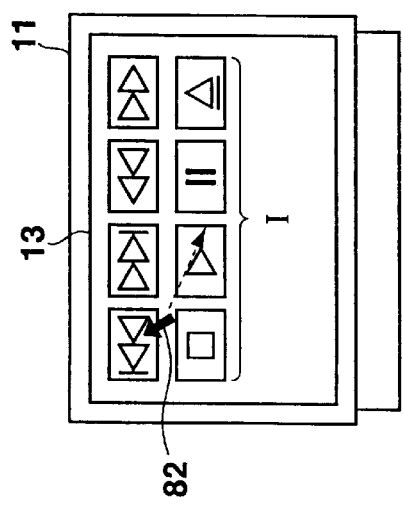
FIG. 12C
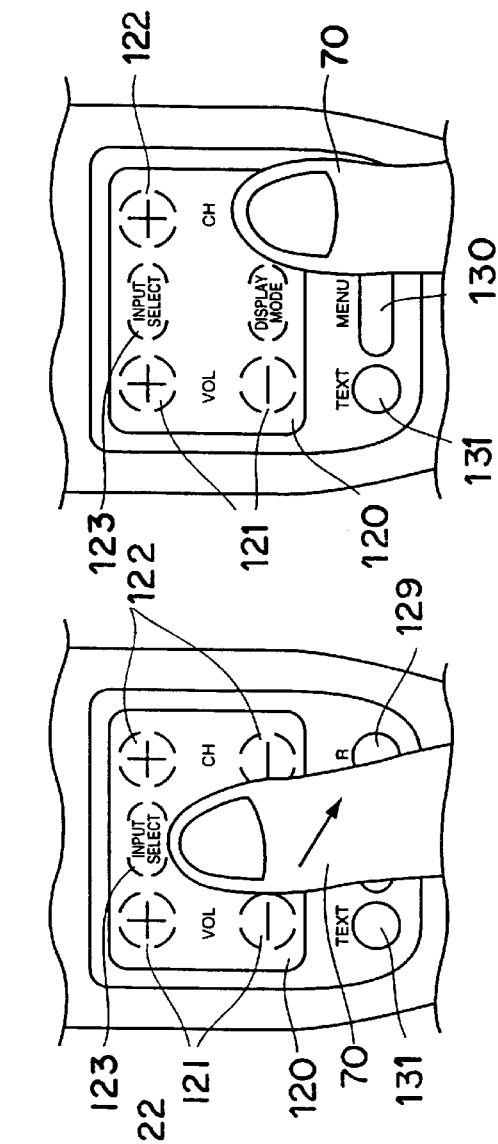
FIG. 12D
FIG. 12E
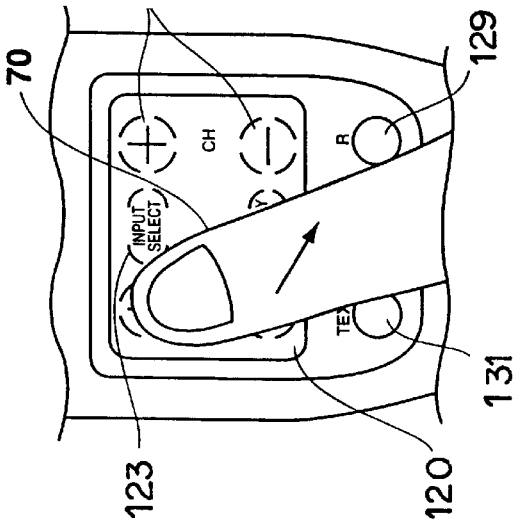
FIG. 12F

REMOTE CONTROL APPARATUS

BACKGROUND OF THE INVENTION

The present invention relates to a remote control apparatus having, for instance, a tablet type positional information input means.

Recently, in general, various sorts of setting operations as well as various adjusting operations for home-use, or for household electronic appliances such as personal computers and television receivers are carried out by the remote control apparatus while, for example, a menu screen is displayed on a display provided with the electronic appliances in an integral form, or separately provided with the electronic appliances. These setting/adjusting operations are performed by employing a remote control apparatus and the like in accordance with contents of this menu screen. Such an operation mode is so-called as a GUI (Graphical User Interface), since a user makes up an interactive communication with the electronic appliances via the above-described menu screen.

This GUI causes the display to display thereon a menu screen on which various sorts of setting/adjusting items are formed as, e.g., icons, and further arrow-shaped pointers for indicating these various sorts of setting/adjusting items. Then, the pointer is moved to the desirable icon by manipulating positional information input means (pointing device) such as a joy stick, and a remote control apparatus having an execution key such as a click key, and thereafter the execution key is clicked. As a result, the control corresponding to the selected icon is executed.

Also, as the positional information input device, for instance, a plane type tablet is known, which is used in combination with a keyboard of a portable type personal computer. This tablet functions to control a position of a pointer which is displayed on a display means based on relative positional information. In other words, the display position of the pointer is changed in response to, for example, the movement of a finger touched on the tablet.

On the other hand, since the GUI is introduced to manipulate the electronic appliances, the operation keys can be reduced, so that the operation unit in the remote control apparatus can be made simple. However, as to a portion of the various operations, it is preferable to provide the operation keys on the remote control apparatus due to frequencies of the operations and an importance of the operations.

In the operation by the GUI, the screen must be switched to display the above-described menu screen. Thus, in the case that a desirable operation is immediately executed, the above-described menu screen should be continuously displayed in a certain form. However, this menu screen will cover an image being displayed on the display. If a large number of the operation keys are provided on the side of a remote control apparatus, then the switch mechanism is required other than the pointing device. Accordingly, there is a problem that the structure becomes complex.

As a consequence, it is required that while a total number of operation keys is reduced, a remote controller is constituted by employing a pointing device.

However, in the case of the above-described tablet, this tablet is arranged in such a manner that, for instance, the pointer and the like are moved in response to the relative positional information, and thus, the pointer is moved only by the amount in response to the movement of the finger. In other words, the amount of movement by the pointer becomes constant within the display region in response to the input of the table.

As a consequence, in such a case that the present position of the pointer is separated from the desirable icon, the positional information must be inputted by largely moving finger and by the repeating the operation. The pointer must be improved with respect to operability. In other words, although the contents of the menu screen can be sufficiently provided by the GUI, it is not possible to achieve the optimum operation feelings in the design of the menu screen. Thus, this pointer operation itself would require cumbersome operations.

SUMMARY OF THE INVENTION

To solve such a problem, a remote control apparatus, according to the present invention, is featured by comprising: an operation panel; input positional information producing means for producing input positional information in response to an input position with respect to the operation panel; a mode key for switching a position input mode and a command input mode; switching means for switching the position input mode and the command input mode in response to operation of the mode key; transmitting means for transmitting a transmission signal; and control means for causing the transmitting means to transmit positional information based on the input positional information as the transmission signal during the position input mode, and for causing the transmitting means to transmit a command signal based on the input positional information as the transmission signal during the command input mode.

In accordance with the present invention, since the pointing device is commonly used with the input means of the frequently executed operations, the total number of operation keys provided on the remote control apparatus can be reduced. As a result, the structure can be made simple while maintaining the functions of the remote control apparatus.

Also, in accordance with the present invention, the pointer can be moved based upon the absolute positional information, or the relative positional information. As a result, such a selection for pointer movement based on absolute cr relative positional information can be made. That is, for example, the pointer is moved in response to the operation (manipulation) amount of the positional information input means such as the tablet, or the pointer is moved in response to the input position of the tablet. As a consequence, the speed of the pointer can be varied in accordance with, for example, the formats of the menu screen (icon constructed as menu item), and the application softwares which are initiated at the same time and displayed as the respective windows, i.e., the usage for the respective regions. Thus, the operability can be increased.

BRIEF DESCRIPTION OF THE DRAWINGS

A more complete understanding of the teachings of the present invention may be acquired by referring to the accompanying figures, in which like reference numbers indicate like features and wherein:

FIG. 4A to FIG. 4C are explanatory diagrams of an operation key group of a remote control apparatus for constituting the remote control system of this embodiment, and schematic diagrams for illustrating such a condition that a user holds the remote control apparatus by his hand.

FIG. 5A to FIG. 5E are other appearances of the remote control apparatus and explanatory diagrams for explaining an internal structure thereof for constituting the remote control system according to this embodiment;

FIG. 6A to FIG. 6E are diagrams for explaining a modification of a click key of the remote control apparatus according to this embodiment;

FIG. 11A to FIG. 11C are diagrams for explaining an operation concept in the tablet mode by the remote control apparatus according to this embodiment;

FIG. 12A to FIG. 12C are diagrams for explaining an operation concept in the tablet mode by the remote control apparatus according to this embodiment;

DETAILED DESCRIPTION OF THE PREFERRED EMBODIMENTS

Figure 1:
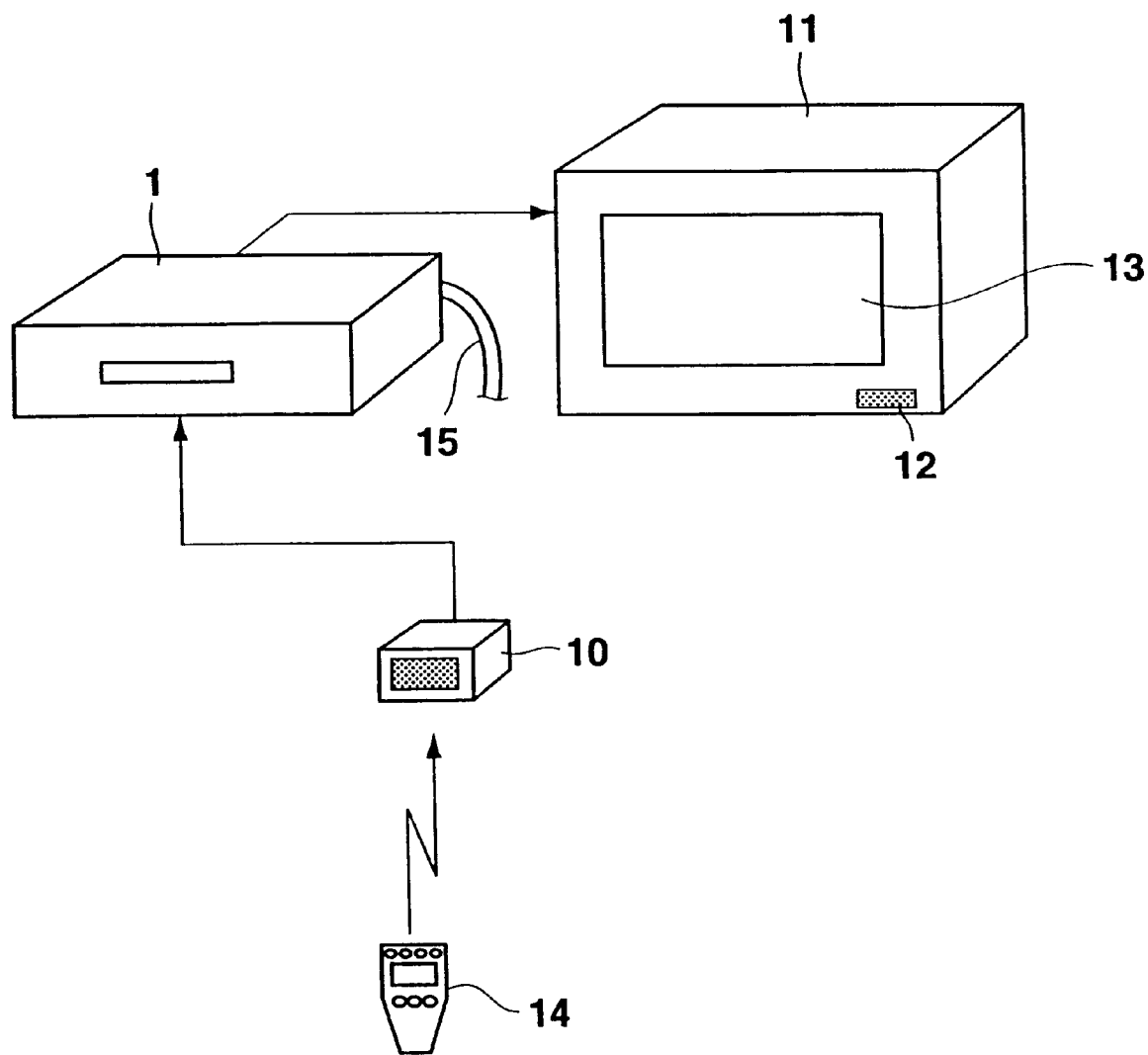
FIG. 1 is a schematic diagram for showing an arrangement of a remote control system according to an embodiment of the present invention.

Referring now to FIG. 1 to FIG. 15, embodiments of the present invention will be explained in accordance with a sequence of the below-mentioned items (1) to (6):
(1) . . . Concept of System,
(2) . . . Structure of Set-top box,
(3) . . . Monitor Apparatus,
(4) . . . Structure of Remote control apparatus,
(5) . . . Transmission format,
(6) . . . Operation concept by Remote control apparatus.
(1) . . . Concept of System FIG. 1 is a diagram for explaining a concept of a remote control system according to this embodiment, in which appliances for constituting the remote control system are represented.

Either position data or a command data (transmit signal) transmitted from a remote control apparatus 14 is supplied to a light receiving unit 10 connected to a set-top box 1, or another light receiving unit 12 provided with a monitor apparatus 11.

The light receiving unit 10 receives the transmit signal transmitted from the remote control apparatus 14 to decode this transmit signal, and supplies a command corresponding to an operation executed in the remote control apparatus 14 to the set-top box 1. In this case, the light receiving unit 10 is separately provided with the set-top box 1 which is connected to this light receiving unit 10 via a connector cable. Alternatively, this light receiving unit 10 may be built in the set-top box 1.

Since the set-top box 1 is connected via, for example, a telephone line 15 to a telephone trunk line, this set-top box 1 has a communication function capable of performing a computer communication, e.g., connecting to the Internet. Then, this set-top box 1 is so arranged that programs and still images (video data and/or audio data) such as the movies and music can be acquired by way of the computer communication.

Also, the set-top box 1, according to this embodiment, may be arranged by employing functions as a general-purpose disk player capable of reproducing various sorts of disk media known as, for example, CD-ROM, Video CD, Photo CD, and CD-DA (Digital Audio), and also other disk media such as CD-extra which may be popularized in near future. As a result, similar to the computer communications, video data and/or audio data may also be acquired from these sorts of disk media. It should be understood that the above-described displayer functions are not always required for the set-top box 1.

The reproduced image/audio of such a set-top box 1 may be monitored by the user by connecting the set-top box 1 to the monitor apparatus 11, or an audio system (not shown). Also, a GUI is employed in the set-top box 1, and when the operation is performed so as to reproduce the above-described disk media, or the Internet is used, the graphics such as the icon are displayed/outputted on the monitor apparatus 11. Then, while observing a CRT (cathode-ray tube) 13, arranged as a display unit of this monitor apparatus 11, the user manipulates the remote control apparatus 14, so that the set-top box 1 is operated.

Figure 3:
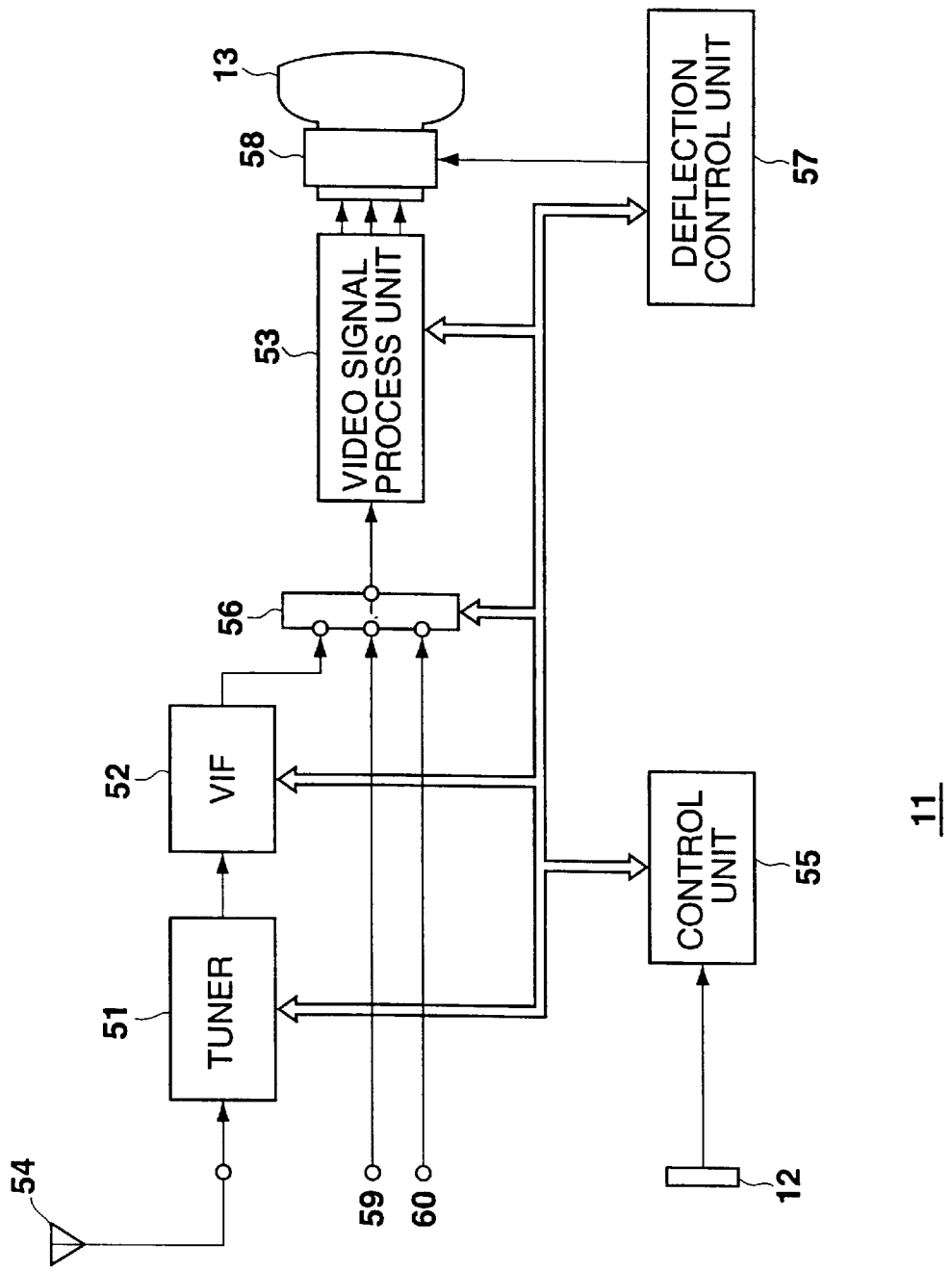
FIG. 3 is a block diagram of a monitor apparatus for constituting the remote control system of this embodiment.

The monitor apparatus 11 is arranged such that this monitor apparatus 11 is connectable with appliances such as the set-top box 1, a video tape recorder and a laser disk player as the external input appliance. Accordingly, users select desired picture (video)/sound (audio) for audience purposes. Also, the monitor apparatus 11 according to this embodiment includes a tuner 51, as shown in FIG. 3, and therefore is capable of receiving broadcasting programs such as ground wave broadcasting, satellite broadcasting, and cable television. It should be noted that a tuner 51 does not have to be provided in this monitor apparatus 11.

It should be noted that although both the set-top box 1 and the monitor apparatus 11 are individually operated by the remote control apparatus 14 in this embodiment, a flag capable of discriminating a sort of an appliance is contained in the command signal transmitted frown the remote control apparatus 14, so that only the desired appliance, i.e., either the set-top box 1 or the monitor apparatus 11 may be controlled. This transmission format will be explained.

Also, as shown in the drawing, the set-top box 1 is separately provided with the monitor apparatus 11. Alternatively, these set-top box 1 and monitor apparatus 11 may be arranged in an integral form.

(2) . . . Structure of Set-top box

Figure 2:
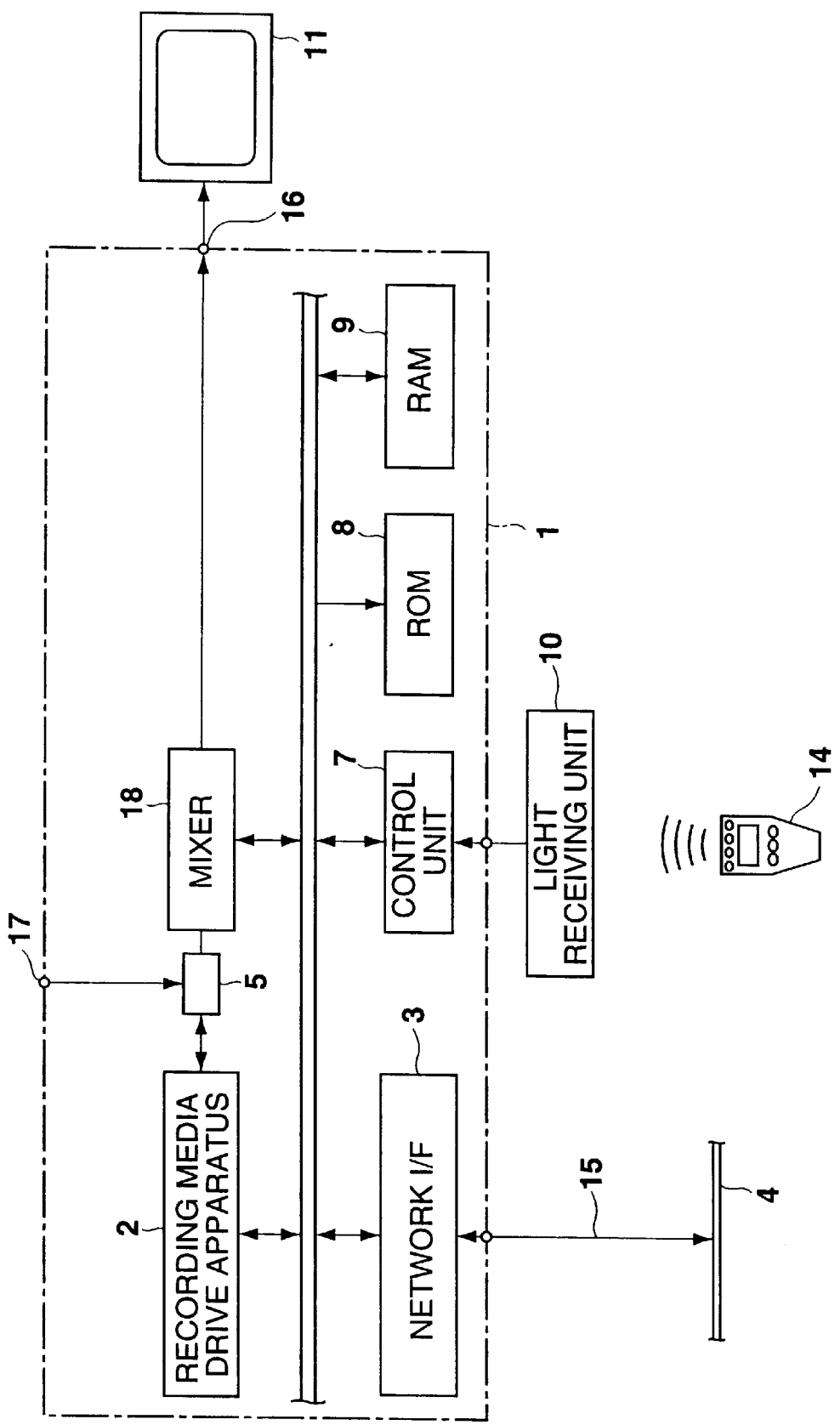
FIG. 2 is a block diagram of a set-top box for constituting the remote control system of this embodiment.

FIG. 2 is a block diagram for explaining a structural example of the set-top box 1.

A recording media drive apparatus 2 is arranged by, reproducing apparatuses for the removable types of various sorts of disk media, and also hard disk apparatuses such as writable disk media. As a result, the set-top box 1 can reproduce various types of information from sorts of disk media to provide the reproduced various information to users. Also, such information which is frequently required may be recorded on the hard disk apparatus, if necessary.

A network interface 3 is connected to a network line 4 by the telephone line 15 shown in FIG. 1, so that information supplied from the network line 4 can be acquired. Conversely, information may be supplied from the set-top box 1 side via the network line 4 to another set-top box, or a computer apparatus.

Also, it is so arranged that the image data and the like supplied from the recording media drive apparatus 2 and the network interface 3 can be outputted as a video (picture) signal to the monitor apparatus 11.

Furthermore, the video signal which is reproduced from the recording media drive apparatus 2, or is inputted from the above-described video appliance via an external input terminal 17 is selected by a switch 5 to be outputted from an output terminal 16. This selected video signal is supplied to the externally arranged monitor apparatus 11. As a consequence, the video can be outputted on the CRT 13 of the monitor apparatus 11. Alternatively, at this time, a GUI image produced from a control unit 7 may be superimposed on the video selected by the switch 5 by a mixer 18, and then the superimposed video may be outputted. Furthermore, only the GUI image may be outputted by switching the switch 5 in such a manner that the video signal is not outputted.

Further, a video signal supplied from a video appliance (not shown) connected to the external input terminal 17 may be recorded on a recording medium stored in the recording media drive apparatus 2.

In response to the transmit signal of the remote control apparatus 14 received by the light receiving unit 10, the control unit 7 is so arranged as to control the recording media drive apparatus 2 and the network interface 3. Furthermore, the control unit 7 includes an OSD (On Screen Display) function for forming a GUI used to control, for instance, the recording media drive apparatus 2, and is arranged in such a manner that a menu screen for executing various operations and setting/adjusting operations can be formed. For instance, the control unit 7 is so arranged as to execute read/write controls for the recording media drive apparatus 2, to produce image data (involving a pointer) used to form the GUI when application software stored in a ROM 8 is used, and to set an access point of the network interface 3.

As will be described with reference to FIG. 11A to FIG. 11C, for instance, when a CD-DA is reproduced by the recording media drive apparatus 2, the control unit 7 is so arranged that various controls such as reproduction, music-head seeking, and stop operations are carried out by the GUI. Furthermore, the control unit 7 is arranged in such a way that the sort of transmit signal sent from the remote control apparatus is discriminated, and only when it is judged that this transmit signal corresponds to such a transmit signal to be executed in the set-top box 1, the content of this transmit signal is executed.

A RAM (Random Access Memory) 9 stores therein application softwares which are read out from the recording media drive apparatus 2 and the ROM 8 and are initiated, and temporarily stores therein the image dada, so that this RAM is used as a work area when, for example, various sorts of editing operations are carried out.

Furthermore, network information supplied via the network interface 3 is also temporarily acquired into the RAM 9, and then is read therefrom by the user selection to be supplied to the video amplifier 5.

Since the set-top box 1 is arranged in this manner, for example, when the recording media drive apparatus 2 is controlled, the various sorts of operations, and the setting/adjusting operations can be executed by the pointing device provided on the remote control apparatus.

(3) . . . Arrangement of Monitor Apparatus

FIG. 3 is a partial circuit block diagram of a video signal system functioning as the monitor apparatus 11.

A tuner 51 is constructed of, for instance, a BS tuner, a CS tuner, a U/V tuner, and the like, and selects a reception signal of a desirable channel from the broadcasting waves received by an antenna 54. The reception signal selected by the tuner 51 is supplied via an intermediate frequency amplifying unit (VIF—Video Intermediate Frequency) 52 and a switch 56 to a video signal process unit 53. The switch 56 selects the reception signal selected by the tuner 51, and the video signals furnished from the set-top box 1 connected to external input terminals 59, 60, and also from other external input appliances (e.g., AV (Audio Visual) appliances such as video deck, and laser disk player, or game machines—not shown in the drawings), and then supplies the signal to the video signal process unit 53.

The video signal process unit 53 executes various signal process operations, for example, separation of color signals, production of color difference signals, and extraction of sync signals, and then supplies R, G, B color video signals to a CRT 13. Also, the sync signals extracted in this video signal supply unit 53 are supplied to a control unit 55.

The control unit 55 inputs therein the command outputted via the light receiving unit 12 from the remote control apparatus, controls the tuning operation by the tuner 51, the switching operation by the switch 56, or executes various image quality adjustments in the video signal process unit 53.

Also, the control unit 55 discriminates the sort of transmit signal sent from the remote control apparatus so as to determine whether or not this discriminated transmit signal corresponds to such a transmit signal to be executed in the monitor apparatus 11.

A deflection control unit 57 produces a horizontal deflection signal at the horizontal synchronization timing in response to the operation clock outputted from the control unit 55 into which the synchronization information of the video signal is inputted, and then supplies the produced horizontal deflection signal to a deflection yoke 58 mounted on a neck portion of a CRT 13.

As a result, the pictures supplied from the tuner 51 and the external input appliance such as the set-top box 1 can be displayed on the CRT 13.

(4) . . . Structure of Remote Control Apparatus

A tablet 120, as shown in FIG. 4A, is arranged in the remote control apparatus 14. This tablet 120 is constituted so that an input coordinate value may be read by way of, for example, an electromagnetic induction system, a resistance pressure sensitive system, and an electrostatic capacitance system. For instance, when a user touches this tablet with his thumb F1, the pointer which is produced by the set-top box 1 and displayed on the CRT 13 of the monitor apparatus 11 can be moved. In other words, when the tablet 120 is touched by the thumb F1 of the operator in a direction along which the pointer is desired to be moved while observing the CRT 13, the pointer can be moved in response to this touch operation. This operation mode, namely a position input mode by tablet 120 will be referred to as a "tablet mode" hereinafter.

It should be noted that in the tablet mode, there are provided a first tablet mode (will be referred to as an "absolute mode" hereinafter) in which a pointer is moved based on absolute position information (X-coordinate data, and Y-coordinate data), and a second tablet mode (will be referred to as a "relative mode" hereinafter) in which the pointer is moved based on relative positional information calculated from the above-described absolute position information.

According to the present embodiment and as shown in FIG. 5A, the following marks are made on the tablet 120, i.e., a sound volume control mark 121 of the monitor apparatus 11, a channel selection mark 122 of the monitor apparatus 11, an input switching mark 123 of the monitor apparatus 11, and a display, mode switching mark 124 for switching normal/wide display modes of the monitor apparatus 11 by way of, for instance, a printing process. In the case that a tablet function switching key 125 is manipulated and then the operation mode is changed into a command mode (will be discussed later), the regions on which these marks are made may have a function equivalent to that of the normal operation key, so that these regions can output commands used to control the monitor apparatus 11.

The tablet function switching key 125 is a selection key capable of switching the tablet mode (absolute mode, relative mode) and the command mode. The tablet function switching key 125 is constituted by, for example, a switch button operated in such a manner that when this switch button is depressed, turning ON/OFF operations can be performed. As the switching operation, the respective modes are sequentially switched every time the key is depressed. Which mode is selected may be discriminated by indicating whether the tablet function switching key 125 emits the light. Such a switch button is arranged by combining a key switch for executing an actual input operation with a light emitting element such as a light emitting diode. The key switch is arranged to have another function capable of turning ON/OFF the light emitting element.

Both a power supply key 126 of the set-top box 1 and a power supply key 127 of the monitor apparatus 11 are employed so as to turn ON the respective power sources of these appliances. A preset key 128 is such an operation key for selecting a maker code of an appliance under control and for setting this maker code in order that the remote control apparatus can be fitted to the set-top box 1 and the monitor apparatus 11 marketed by the respective makers. Since the maker code is selected and set by using this preset key 128, the remote control apparatus can be fitted to the appliances of various makers.

A cancel key 129 is employed as an operation key capable of releasing a selection by a click key in the tablet mode as will be explained in FIG. 5A to FIG. 5D. A GUI menu key 130 is arranged such that a GUI menu (menu screen; operation item selection screen, operation screen, sound volume, i.e., control displays) with respect to the set-top box 1 is displayed on the CRT 13 of the monitor apparatus 11 by manipulating this GUI menu key 130.

A software key 131 is such a selection key capable of selecting a desirable application software to become active in the case that, for instance, a plurality of application softwares are initiated by the set-top box 1.

Next, operation modes of the remote control apparatus will now be explained.

While the command mode is selected, if the area of the sound volume control mark 121 is touched by, for example, the thumb F1 of the operator, then the sound volume control of the monitor apparatus 11 can be performed. Similarly, in the command mode, when the areas of the channel selection mark 122, the input switching mark 123, and the display mode switching mark 124 in the tablet 120 are touched by the thumb F1 of the operator, the various control operations of the monitor apparatus 11 such as the channel selecting operation, the input switching operation, and the display mode switching operation can be performed. As a consequence, since the tablet mode and the command mode are selected by the tablet function switching key 125, if required, the control operation of the set-top box 1 and the control operation of the monitor apparatus 11 can be selectively performed by using the tablet 120. As a consequence, the operation keys corresponding to the respective marks can be omitted.

Alternatively, the control operation of the set-top box 1 may be performed by touching a preselected area of the tablet 120 with, for instance, the thumb F1 of the operator.

It should be understood that although the tablet 120 is employed in this embodiment, if no command mode is required, then this tablet may be replaced by, for example, a track ball and a joy stick.

As indicated in FIG. 5A to FIG. 5E, in the remote control apparatus 14, a commander main body 115 is constructed of an upper case 116 molded by synthetic resin, a front-side lower case 117, and a battery lid 118 for constituting a rear-side lower case. Then, the front-side lower case 117 is coupled in an integral body to a lower portion of approximately half of a front-side (arrow direction "a") upper case 116 along arrow directions "a" and "b" in a front-rear longitudinal direction by employing a screw and/or claw engagement structure. The battery lid 118 is detachably mounted on a lower portion of approximately half of a rear-side (arrow direction "b") region of the upper case 116 along the longitudinal direction. At this time, the battery lid 118 is detachably mounted on the upper case 116 of the main body 115 in the horizontal direction by the insertion method from the arrow directions "a" and "b".

Then, a region $115a_1$ of a substantially half that is front side of an upper surface 115a of this main body 115 along the front/rear longitudinal direction is horizontally formed. Another region $115a_2$ that is substantially half of the rear side of the upper surface 115a is formed as a slightly inclined surface downwardly along the rear direction (arrow direction "b").

Then, front sides $115e_1$ of right/left side surfaces 115e of this main body 115 are formed in parallel to each other, and rear sides $115e_2$ thereof are formed as a substantially ship-nose-shaped inclined surface made in such a manner that these rear sides are gradually narrowed to a center side in accordance with the rear portion (arrow direction "b"). A stepped portion is formed on a lower surface 115b of this main body 115 by a horizontal portion $115b_1$ formed at the front side, and an inclined portion $115b_2$ which is inclined at a preselected angle "θ" upwardly in the rear direction in such a region which occupies substantially ⅔ of the entire length of the main body 115 and located at a rear side from this horizontal portion $115b_1$. Then, this inclined portion $115b_2$ is formed as a ship-bottom-shape in such a manner that this inclined portion $115b_2$ is gradually narrowed downwardly on the center side.

Then, on the lower surface 115b of this main body 115, two sets of concave portions are formed on the front/rear sides, i.e., a concave portion 150 formed in an obtuse shape between the horizontal portion $115b_1$ and the inclined portion $115b_2$, and a substantially semi-circular shaped concave portion 151 formed at a position adjacent to the front side of the battery lid 118 and also located at a rear side of this concave portion 150.

Also, an opening 149 having a substantially rectangular shape is formed at a position on the upper surface 115a of this main body 115. This position is slightly shifted from a central position of the front/rear direction (arrow directions of "a" and "b") on the side of a front edge 115c. Then, the tablet 120 is arranged in this opening 149. At this time, a printed circuit board 137 is horizontally assembled inside the upper case 116 of the main body 115 by way of a screw.

The tablet 120 is mounted on the upper surface of this printed board 137, and then is horizontally arranged within the opening 149.

Then, the tablet function switching key 125, the set-top box power supply key 126, the TV power supply key 127, and the like are arranged in a transverse one-line manner on the upper surface 115a of the main body 115 at the front side of the tablet 120. The cancel key 129, the GUI menu key 130, the software key 131, and the like are arranged in a transverse one-line manner at the rear side of the tablet 120. It should be noted that these kelps 125, 126, 127, 129, 130, and 131 are made of rubber keys containing carbon, and are arranged on switch terminals arranged in a printed manner on the upper surface of this printed circuit board 137.

Then, a click key arranging surface 152 is formed on the concave portion 150 formed on the lower surface 115b of this main body 115 at the front edge side thereof. This click key arranging surface 152 is directed toward a front inclined lower direction (arrow direction of "b") by being downwardly raised at an obtuse angle with respect to the horizontal portion $115b_1$. A click key 132 is arranged on this click key arranging surface 152, and is used to determine such an item selected on the reception side based on the positional information entered by the tablet 120.

Then, a microswitch 138 is mounted on the lower surface of the printed circuit board 137, and a switch operation plate 140 rotatably assembled inside the front-side lower case 117 around a fulcrum 141 is interposed between the click key 132 and the microswitch 138. When the click key 132 is depressed, the microswitch 138 is depressed via the switch operation plate 140.

Then, a light emitting unit 136 made from light-transmitting semitransparent synthetic resin is engaged with the front edge 115c of this main body 115, and a light emitting diode 139 mounted on the lower surface of the printed circuit board 137 is arranged inside of this light emitting unit 136. Two pieces of UM-3 batteries 153 are stored inside the battery lid 118 of this main body 115.

The main body 115 of this remote control apparatus 14 is constructed according to the above-described structure. As illustrated in FIG. 4A to FIG. 4C, this remote control apparatus 14 is constituted in such a manner that a user can easily grip this main body by his single hand (for instance, right hand), and moreover the user can smoothly manipulate the tablet 120 and the click key 132 in a similar manner to manipulations of a hand gun while gripping this main body by his single hand.

In other words, when the main body 115 is gripped by, for instance, the right hand of the user, the user can grip this main body 115 in a natural manner as follows. While utilizing the substantially ship-head-shaped narrowed form and the substantially ship-bottom-shaped narrowed form provided on the rear end 115d of the main body 115, the three surfaces thereof (namely, upper surface 115a, right side surface 115e, and lower surface 115b) are wrapped by the palm of the user along the three directions. At the same time, the thumb $F_1$ of the user is put on the upper surface 115a, whereas the remaining four fingers $F_2$ to $F_5$ are inserted around the lower surface 115b.

At this time, when the user lightly depresses the tablet 120 of the upper surface 115a with the thumb $F_1$ of his right hand, puts the middle finger $F_3$ across the concave portion 151 on the rear side, and slightly grips the rear end 115d by wrapping the ring finger $F_4$ and the little finger $F_5$ around this rear end, the user can grip the click key 132 of the click key arranging surface 152 of the front-side concave portion 150 in a natural way in such a similar manner to when the index finger $F_2$ grips a trigger of a pistol.

As a consequence, under such a condition that the main body is gripped by a user's right hand in a natural way, a desirable position of the tablet 120 of the upper surface 115a can be freely and quickly depressed by his thumb $F_1$. Moreover, at this time, immediately after the desirable position of the tablet 120 is depressed by the thumb $F_1$ of the user, the click key 132 can be quickly depressed in a natural way by the index finger $F_2$ of the user.

As explained above, in accordance with this remote control apparatus 14, immediately after the desirable position of the tablet 120 is depressed by the thumb $F_1$ so as to input the positional information, the click key 132 is quickly pushed by the index finger $F_2$, so that the positional information of this tablet 120 can be quickly determined. Therefore, this remote control apparatus 14 can prevent such an erroneous operation that the positional information of the tablet 120 is shifted by inclination of the thumb $F_1$ within a very short time period defined after the positional information has been entered by the thumb $F_1$ and until the click key 132 is pushed. Thus, this shifted positional information is determined after pushing the click key 132. Thus, the correct positional information can be continuously and quickly transmitted to the reception side, so that the high operability can be realized.

Then, since this main body 115 includes the concave portion 151 formed in the front side of the battery lid 118, the battery lid 118 is simply slid along the arrow direction of "b", namely backwardly while hooking the finger on this concave portion 151, so that this battery lid 118 can be removed. Thus, the battery 153 can be easily replaced.

As represented in FIG. 6A to FIG. 6E, another embodiment of the remote control apparatus 14 is constructed by a determining click key 132a and a canceling click key 132b that are vertically arranged close to each other on the click key arranging surface 152 of the front-side concave portion 150. The determining click key 132a is used to determine the item selected on the reception side in response to the positional information entered by the tablet 120. The canceling click key 132b is used to cancel the item determined by this determining click key 132a.

It should be noted that this remote control apparatus is constituted as follows: That is, two sets of switch operation plates 140a and 140b which are independently and rotatably assembled inside the front-side lower case 117 of the main body 115 around a fulcrum 141a and another fulcrum 141b are interposed between two sets of click keys 132a, 132b and two sets of microswitches 138a, 138b mounted on the lower surface of the printed circuit board 137. When two sets of click keys 132a and 132b are separately depressed, these two microswitches 138a and 138b are independently depressed via two sets of switch operation plates 140a and 140b, respectively.

As a result, according to this remote control apparatus 14, similar to the above-described remote control apparatus, immediately after a desirable position of the tablet 120 is depressed by the thumb $F_1$ to input the positional information, the determining click key 132a is quickly depressed by the index finger $F_2$, so that this positional information can be quickly determined. Moreover, when the positional information is erroneously entered by the tablet 120, or when this entered positional information is changed, the index finger $F_2$ is quickly shifted from the determining click key 132a to the canceling click key 132b and then depresses this canceling click key 132b, so that the positional information of the tablet 120 can be quickly canceled, resulting in an improvement of operability of this remote control apparatus.

Figure 7:
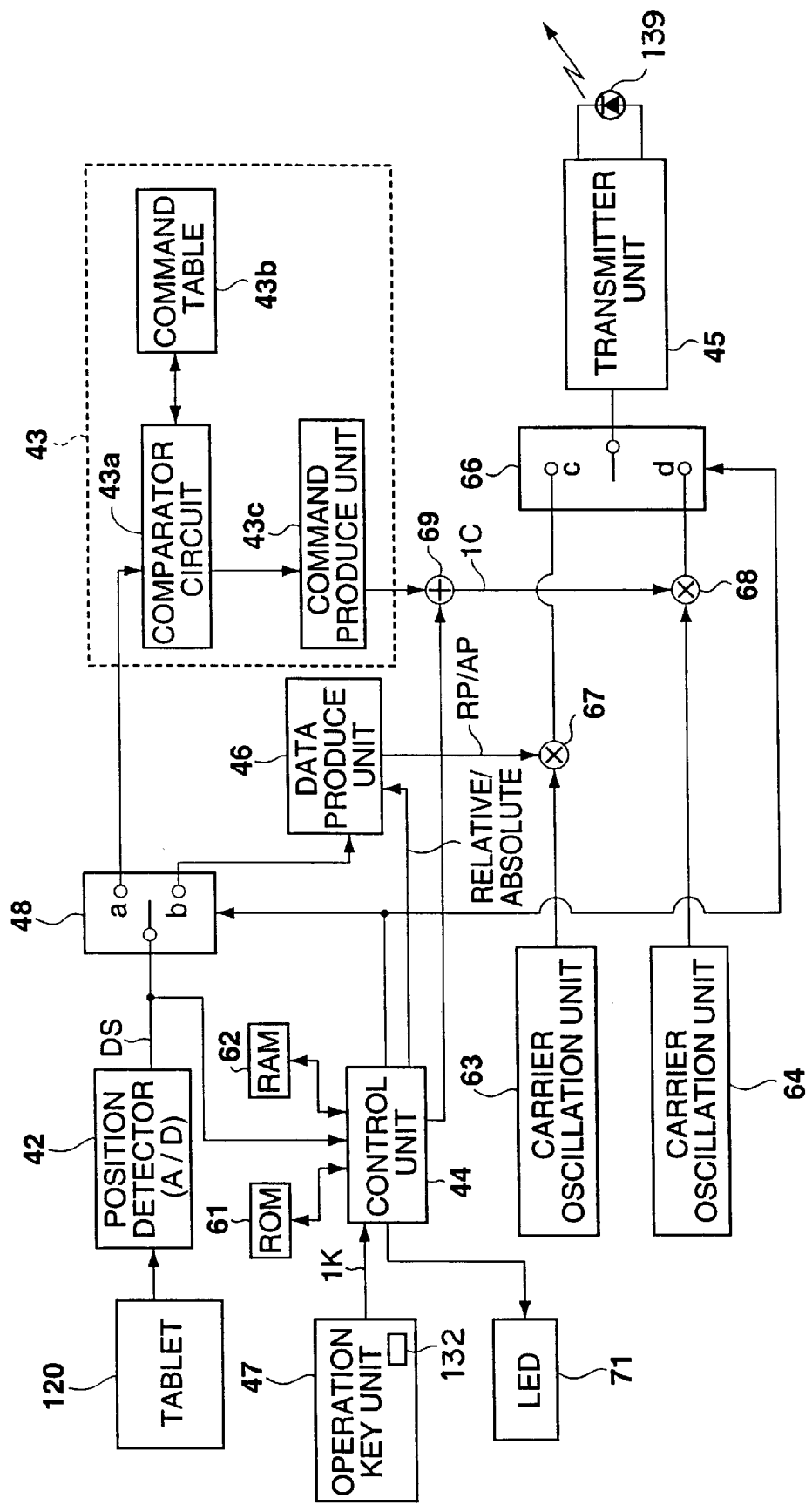
FIG. 7 is a block diagram of the remote control >i apparatus according to this embodiment.

FIG. 7 is a diagram for showing an example of a circuit block for constructing the remote control apparatus 14.

As previously explained, there are provided the tablet 120, an operation key unit 47 constructed of various sorts of operation keys, and the click key 132, which are provided on the front surface side thereof. To detect an operation position of the tablet 120, electrodes for outputting voltages in response to the operation position of the tablet 120 are provided along an X-axis direction and a Y-axis direction of the tablet 120 in this tablet 120. As a result, when the tablet 120 is touched by, for example, the thumb $F_1$ of the user, the entered positional information is supplied to a positional information detecting unit 42 as a voltage signal. Then, this voltage level is digitalized in a positional information detecting unit 42, and the input positional information is supplied as an input detection signal DS constructed of X-axis data and Y-axis data (both data are equal to absolute coordinate data) via a switch 48 to either a command converting unit 43 or a data process unit 46.

The command converting unit 43 is constructed of, for instance, a comparator circuit 43a, a command table 43b, and a command produce unit 43c.

The comparator circuit 43a compares X-coordinate data and Y-coordinate data of a command snored in the command table 43b with the supplied X-coordinate data and Y-coordinate data to thereby output command data corresponding to the supplied X-coordinate data and Y-coordinate data. The command produce unit 43c produces packet data containing the command data outputted from the comparator circuit 43a. This packet data will be explained later.

The switch 48 is switching-controlled by a control unit 44. When the command mode is selected by the tablet function switching key 125 shown in FIG. 5A, this switch 48 is switched to a terminal "a" side, so that the input detection signal DS outputted from the positional information detecting unit 42 is supplied to the comparator circuit 43a. When the tablet mode is selected, the switch 48 is switched to another terminal "b" side. As a result, the input detection signal DS is supplied to the data produce unit 46 so as to be converted into packet data. Another switch 66 is switching-controlled in combination with the switch 48. When the tablet mode is selected, a terminal "c" side of the switch 66 is switched, whereas when the command mode is selected, another terminal "d" side thereof is switched.

When the tablet mode is selected, the input detection signal DS is supplied via the terminal "b" of the switch 48 to the data produce unit 46. Then the input detection signal DS is converted into a packet data having a transmission format (will be explained later in FIG. 8) by the data process unit 46. The output signal (data packet) derived from the data process unit 46 is modulated in a mixer 67 with a carrier signal having a frequency of, for instance, 455 KHz outputted from a carrier oscillation unit 63, and then the modulated signal is supplied via the terminal "c" of the switch 66 to the transmitter unit 45. Then this modulated signal is transmitted as infrared light from the light emitting unit 139. In this case, when the absolute mode is selected, the data produce unit 46 produces absolute positional information AP in response to the detection signal. When the relative node is selected, the data produce unit 46 calculates relative positional information RP and outputs this relative positional information RP to a transmitter unit 45.

When the command mode is selected, the input detection signal DS is supplied via the terminal "a" of the switch 48 to the command converting unit 43. Then, as will be explained later in FIG. 9, the command converting unit 43 converts the input detection signal DS into a data packet with a transmit format, and then supplies the data packet as command information IC via an adder 69 to the mixer 68. In this mixer 68, tablet input information IT is modulated with a carrier signal having a frequency of, for instance, 38 KHz outputted from another carrier oscillation unit 64, and the modulated signal is supplied via the terminal "d" of the switch 66 to the transmitter unit 45. Then, in response to the signal entered from the transmitter unit 45, the light emitting unit 139 is driven. As a result, infrared light is transmitted from the light emitter unit 45 in response to the command information IC.

In the case that key input signals IK of the various sorts of operation keys are supplied from the operation key unit 47, control unit 44 reads a command code corresponding to the relevant key input signal IK from a ROY. 61. Then, the read command code is supplied via adder 69 to the mixer 68. As a consequence, the command code is modulated with the carrier signal having a frequency of, e.g., 38 KHz derived from the carrier oscillation unit 64, and then the modulated command code is supplied via the terminal "d" of the switch 66 to the transmitter unit 45 so as to be transmitted from the light emitting unit 139.

It should be understood that the transmission process operations during the tablet mode and the command mode are executed by detecting the input detection signal DS supplied from the input information detecting unit 42.

In response to the operation of the tablet function switching key 125 provided on the operation key unit 47, a light emitting diode (LED: Light Emitting Diode) 71 is turned ON/OFF.

In response to the signal selected by the switch 66, the transmitter unit 45 causes the light emitting unit 139 to emit the light, and then transmits this light to either the set-top box 1 or the monitor apparatus 11. The transmit signal transmitted from the light emitting unit 139 is received by the light receiving unit 10 and the light receiving unit 12 of the monitor apparatus 11, and thereafter is demodulated, so that various sorts of control operations are carried out.

In other words, for example, when the tablet mode is selected, in the case that either the relative positional information RP or the absolute positional information AP is transmitted, the set-top box 1 executes the control operation to move the pointer in response to this positional information. Also, for instance, when the command mode is selected, in the case that an input is made in the area of the channel selection mark 122, such a control operation for selecting the broadcasting channel is carried out.

This is because the sort of the transmit signal (command or positional information) transmitted from the remote control apparatus 14 is discriminated based on a command discrimination code of a transmission format (will be subsequently explained), and thus the various sorts of control operations are carried out in the set-top box 1, or the monitor apparatus 11.

It should be understood why the two sorts of carriers are used in this embodiment. Only considering to such a case that the command transmission is carried out, 38 KHz may be used as the normal carrier frequency of the remote control apparatus. When the pointing operation is carried out in the tablet mode, since the high operation precision of the pointer is required, the carrier frequency of 455 KHz is used. As a consequence, the light receiving unit 10 of the set-top box 1 is arranged in accordance with, for example, the carrier frequency of 455 KHz, whereas the light receiving unit 12 arranged in the monitor apparatus 11 is arranged in accordance with, for example, the carrier frequency of 38 KHz. As a result, the demodulation system of the command data such as the channel selection and the sound volume control in the monitor apparatus 11 may be used with the conventional arrangement.

Also, in the example explained in FIG. 7, the positional information is modulated by, for example, the carrier frequency of 455 KHz, and the command information IC is modulated by, for instance, the carrier frequency of 38 KHz. Alternatively, the command information IC may be modulated by the carrier frequency of 455 KHz and the modulated command information IC may be transmitted. Accordingly, only the demodulation system for the carrier frequency of 455 KHz may be employed on the reception side. Therefore, there is a merit that the arrangement may be simplified.

(5) . . . Transmission Format

Figure 8A:
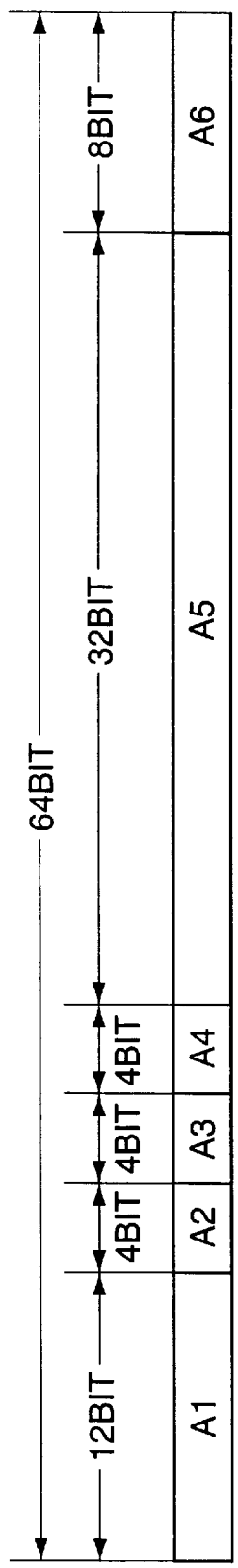
FIG. 8A and FIG. 8B are illustrations for explaining a packet format transmitted at a carrier frequency of 455 KHz from the remote control apparatus according to this embodiment.

Next, a description will now be made of a format of a packet with a carrier frequency of, for instance, 455 KHz transmitted by the remote control apparatus 14 with reference to FIG. 8A and FIG. 8B.

A command signal according to this embodiment mode is transmitted in such a manner that a unit of a data group having a fixed length is called as a "packet". In FIG. 8A, there is shown a data structure of one packet. As shown in FIG. 8A, 1 packet is made of 64 bits, and is constructed of a maker discrimination code area A1, a remote control apparatus discrimination code area A2, a same remote control apparatus discrimination code area A3, a data discrimination code area A4, a data area A5, and a parity area A6.

The maker discrimination code area A1 (12 bits) is such a region that a code for discriminating a maker of the remote control apparatus 14 is set. Subsequently, the same remote control apparatus discrimination code area A2 (4 bits) is such a region that a code for discriminating a sort of a remote control apparatus in the same maker is set. The same remote control apparatus discrimination code area A3 (4 bits) is such a region that a code used to discriminate the same sort of remote control apparatus is set. The data discrimination code area A4 (4 bits) is such a region that a code used to discriminate a sort of data of a data area is set. In other words, according to this embodiment, the data discrimination code area A4 is such a data region that the key/tablet input signal issued by the key input or the input of the tablet 120 in the command mode, or the detection signal of the tablet 120 in the tablet mode or such a flag for discriminating as to whether the input data corresponds to the absolute coordinate data or the relative coordinate data in the tablet mode are set.

As to each of these areas (A1 to A4), the codes are applied which are set in accordance with the corresponding maker and the sort of remote control apparatus, and also the sort of data based on the transmission format. It should be noted that these code data are also previously stored in the command table 43b, or the ROM 61.

A data area A5 (32 bits) is such a region that either the command information IC or the positional information RP/AP indicative of the entered operation key or the click key 132 are allocated thereto. In this embodiment, when the tablet mode is selected, the positional information (absolute positional information AP or relative positional information RP) is written. As previously explained, alternatively, the command information IC (for example, sound volume control, channel selection) when either the key input signal IK of the operation key unit 47 or the command mode is selected may be allocated.

A final error detection area A6 (8 bits) is a parity bit region used to detect an error.

Figure 8B:
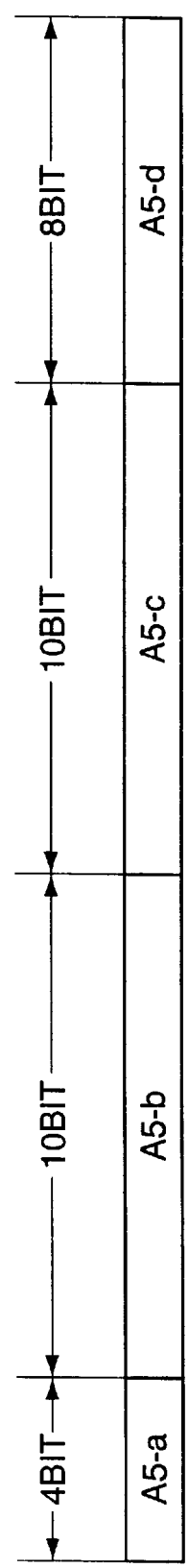

FIG. 8B is an explanatory diagram for explaining an example of a format of the data area A5.

A click key data area A5-a (4 bit) is such a region used for discrimination data for discriminating whether or not the click key 32 is inputted, and a flag indicative of an effectiveness of this discrimination data is valid.

For example, a first bit of the click data area is an area for indicating an input of the click key 132 (or 132a), and a third bit thereof is an area for representing an input of the cancel key 129, or of the cancel key 132b, in which when the key input is made, "1" is set. In other words, according to this embodiment, when it is so judged by the set-top box 1 as the reception side that "1" is set to the first bit of the click key data area A5-a, such a judgment is made that the click key 132 is inputted, and a command corresponding to the subsequently entered coordinate data is executed.

It should be noted that when such a key as the click key 132 and the cancel key 129 is employed by which the key input is performed by the click operation, this second bit may be used for this key.

A fourth bit is an area used for a valid/invalid flag of the data effectiveness flag. When the flag is valid, "1" is set, whereas when the flag is invalid, "0" is set.

The X-coordinate data and the Y-coordinate data as the absolute coordinate data,, or the relative coordinate data detected by the positional information detecting unit 42 by the inputs of the tablet 120 are written into an X-coordinate area A5-b (10 bits) and a Y-coordinate area A5-c (10 bits), and then are transmitted.

That is to say, the coordinate data written in these X-coordinate area A5-b and Y-coordinate area A5-c are decoded on the side of the set-top box 1, so that such a control for displaying the pointer at a position corresponding to the coordinate value entered by the tablet 120 can be carried out.

Also, in such a case that the kelp input signal IK, or the tablet input signal IT is written into the data area A5, the control operation corresponding to this command is executed in the set-top box 1, or the monitor apparatus 11.

Figure 9:
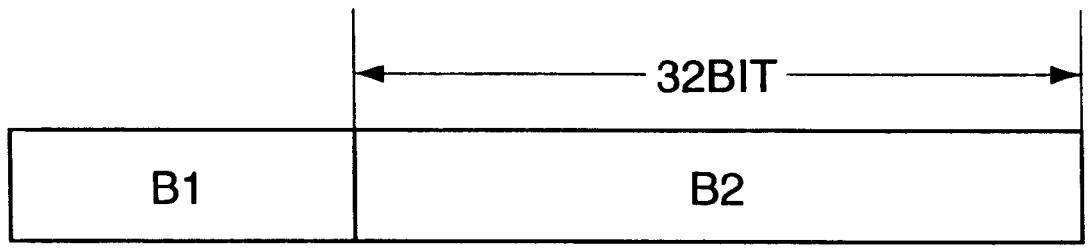
FIG. 9 is a diagram for explaining a packet format transmitted at a carrier frequency of 38 KHz from the remote control apparatus according to this embodiment.

Also, for instance, a format of: a packet having a carrier frequency of 38 KHz transmitted by the remote control apparatus 14 is represented in FIG. 9.

A machine sort category area B1 is set as a region such that a code is set which may discriminate an electronic appliance to be controlled such as the set-top box 1, the monitor apparatus 11, and a VTR (Video Tape Recorder). A data area B2 is set as a region to which various sorts of command codes, for example, channel selection, sound volume control, and reproduction/recording are allocated. These command codes are set with respect to each of the electronic appliances. As a consequence, for example, when the sound volume control of the monitor apparatus 11 is carried out, the code indicative of the monitor apparatus 11 is written into the machine sort category area B1, and the command information IC related to the sound volume control is written into the data area B2.

It should be understood that the format shown in FIG. 9 is one example, and as the practical format, at least the machine sort category area B1 and the data area B2, shown in this drawing, may be constituted. Other data items may be added to constitute the practical format, if required.

(6) . . . Operation concept by Remote Control Apparatus 14

FIG. 10A to FIG. 10D and FIG. 11A to FIG. 11C are illustrations for showing an example of display modes of the CRT 13 of the monitor apparatus 11 in the case that various sorts of operations are carried out by the tablet 120 of the remote control apparatus. FIG. 10A to FIG. 10D are screen displays of the CRT 13 in the command mode. FIG. 11A to FIG. 11C indicate inputs of the tablet 120 and moving conditions of the pointers displayed on the CRT 13 in the tablet mode (absolute mode, relative mode).

Figure 10A:
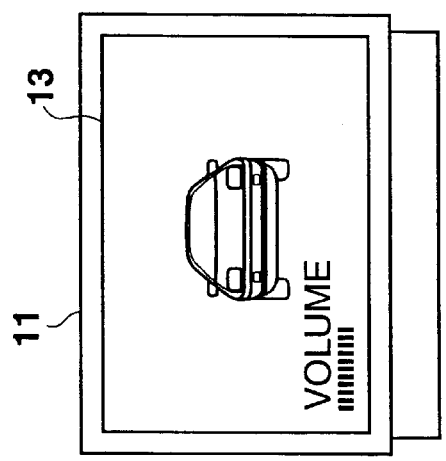
FIG. 10A to FIG. 10D are diagrams for explaining an operation concept in the command mode by the remote control apparatus according to this embodiment.
Figure 10B:
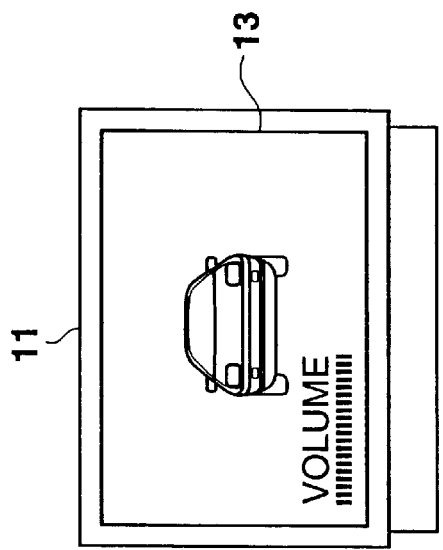
Figure 10C:
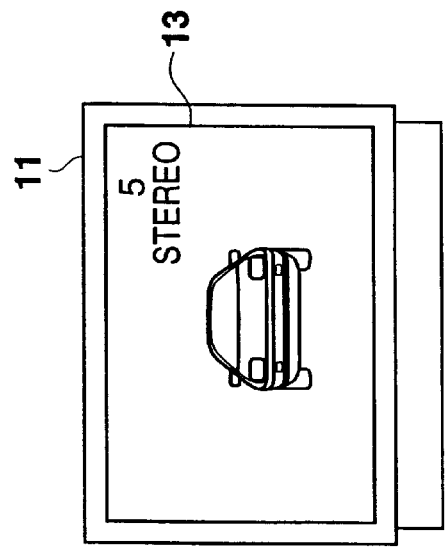
Figure 10D:
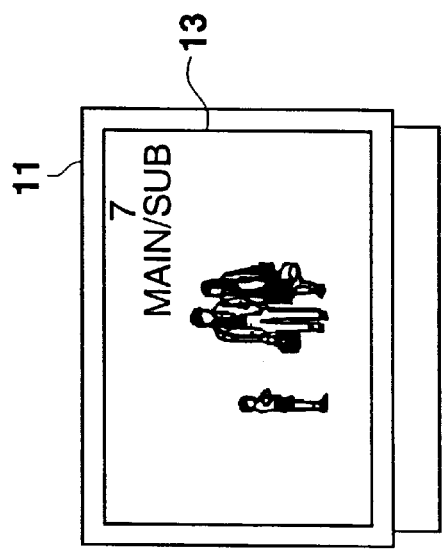

In such a case that the command mode is selected by manipulating the tablet function switching key 125, for instance, when the area of the sound volume control mark 121 of the tablet 120 (as previously explained in FIG. 5A) is manipulated, the sound volume can be controlled, as shown in FIG. 10A and FIG. 10B, for instance. Similarly, when the area of the channel selection mark 122 of the tablet 120 is manipulated, for example, as indicated in FIG. 10C and FIG. 10D, the broadcasting channel under selection can be switched from, e.g., "5 channel" to "7 channel".

In the case that the tablet mode is selected by manipulating the tablet function switching key 125, when the GUI menu key 130 is operated, a menu screen is produced in the video amplifier 5 of the set-top box 1 and then is displayed on the CRT 13. In this case, it is assumed that the input channel of the monitor apparatus 11 is previously switched to the set-top box 1 and thus, the reproduced data such as music and the movies furnished from the set-top box 1 is observed.

As indicated in FIG. 11A, for example, on the menu screen, there are shown an icon region 81 constituted by icon-shaped various sorts of operation items (reproduce, pause, stop, etc.), and, for instance, an arrow-shaped pointer 82. When the tablet 120 is touched by, e.g., the thumb $F_1$ of the user, this pointer 82 can be moved in such a manner that the display position on the screen indicated by an arrow of a broken line can be moved in response to the touched direction and the touched distance. The move amount of the pointer 82 corresponds to the move amount of the thumb $F_1$ on the tablet 120 at this time.

Then, as indicated in FIG. 11B, for example, when the pointer 82 is moved to the display area where the reproduction-indicating icon is displayed and the click key 132 is manipulated, the control operation for reproducing data is carried out. As a result, the recording media drive apparatus 2 reads desirable data from the recording media.

In FIG. 11A and FIG. 11B, there are shown such an example that the picture under observation is switched into the menu screen of the GUI by manipulating the GUI menu key 130. However, since the picture is not completely displayed in this case, as represented in FIG. 11C, a menu screen 83 may be displayed in a superimposed manner. As a result, for example, when the movies are observed, both the picture and the menu screen 83 can be displayed at the same time.

FIG. 12 represents an example of display modes of the CRT 13 of the monitor apparatus 11 when the various operations are carried out by the tablet 120 of the remote control apparatus 14.

In the case that the tablet mode is selected by manipulating the tablet function switching key 125, when the GUI menu key 130 is manipulated, as indicated in FIG. 12A, 12B, 12C, menu screens are produced to be displayed on the CRT 13 of the monitor apparatus 11. In this menu screen, an icon group I made of various sorts of operation items (reproduce, pause, stop etc.) and the pointer 82 are displayed.

In this case, it is now assumed that the user observes the reproduced data (supplied from computer communication, or disk media) such as movies and music, which is supplied from the set-top box 1, while the input channel of the monitor apparatus 11 is previously switched by the set-top box 1.

It should also be noted that FIG. 12D, FIG. 12E, FIG. 12F indicate input conditions of the tablet 120 in correspondence with FIG. 12A, FIG. 12B, FIG. 12C.

In the relative mode, for example, as indicated in FIG. 12A, under such a condition that the pointer 82 is displayed in an upper left portion of the CRT 13, when the thumb $F_1$ is moved from the upper left portion to the central portion while touching the thumb $F_1$ on the tablet 120 as indicated by a solid-line arrow from such a condition shown in FIG. 12D to a condition shown in FIG. 12E, the pointer 82 is also moved in conjunction with the movement of the thumb $F_1$ along a direction indicated by a broken-line arrow in FIG. 11A. Then, this pointer 82 is moved to the center portion of the CRT 13 as indicated in FIG. 11B.

Furthermore, for example, as indicated in FIG. 12E to FIG. 12F, when the thumb $F_1$ is moved to the lower right portion of the tablet 120 along the direction as indicated by a solid-line arrow in FIG. 12E, the pointer 82 is also moved to the right lower portion of the CRT 13 in conjunction with the movement of the thumb $F_1$ along the direction as indicated by a broken line shown in FIG. 12B. Then, this condition is shown in FIG. 12C.

Also, with respect to the input of the tablet 120 in the tablet mode, the absolute positional information is transmitted, so that a desirable icon may be directly pointed out on the menu screen. Then, while setting this directly pointing mode as another tablet mode, the tablet function switching key 125 is selected, so that a desirable icon may be selected without moving the thumb $F_1$ on the tablet 120. In this case, while the tablet function switching key 125 is manipulated, the mode is switched in such a sequence defined by, for instance, the command mode, the absolute mode, and the relative mode.

Alternatively, the directly pointing operation may be realized by transmitting the absolute positional information while touching the area of the tablet 120, which corresponds to the position where a desirable icon is displayed on the menu screen. In other words, as represented in FIG. 12D, 12E, 12F, the thumb $F_1$ is not moved, but when the area of the tablet 120 as shown in FIG. 12D is touched, the pointer 82 is displayed at the position shown in FIG. 12A. Also, when the position indicated in FIG. 12E is touched, the pointer 82 is displayed at the position shown in FIG. 12B.

In other words, while the input region of the tablet 120 is made in correspondence with the display region of the CRT 13 by 1:1, the pointer 82 may be moved based upon the absolute positional information.

As a result, even when the pointer 82 is moved while displaying such a menu screen as in the drawings on the monitor apparatus 11 constituted by a specifically large-sized display screen, the desirable icon may be readily pointed out without requiring the large movement and the repeating operation. Then, the pointer 82 is moved to the desirable icon and then the click key 82 is manipulated, so that the command may be executed in response to this pointed icon.

Figure 13:
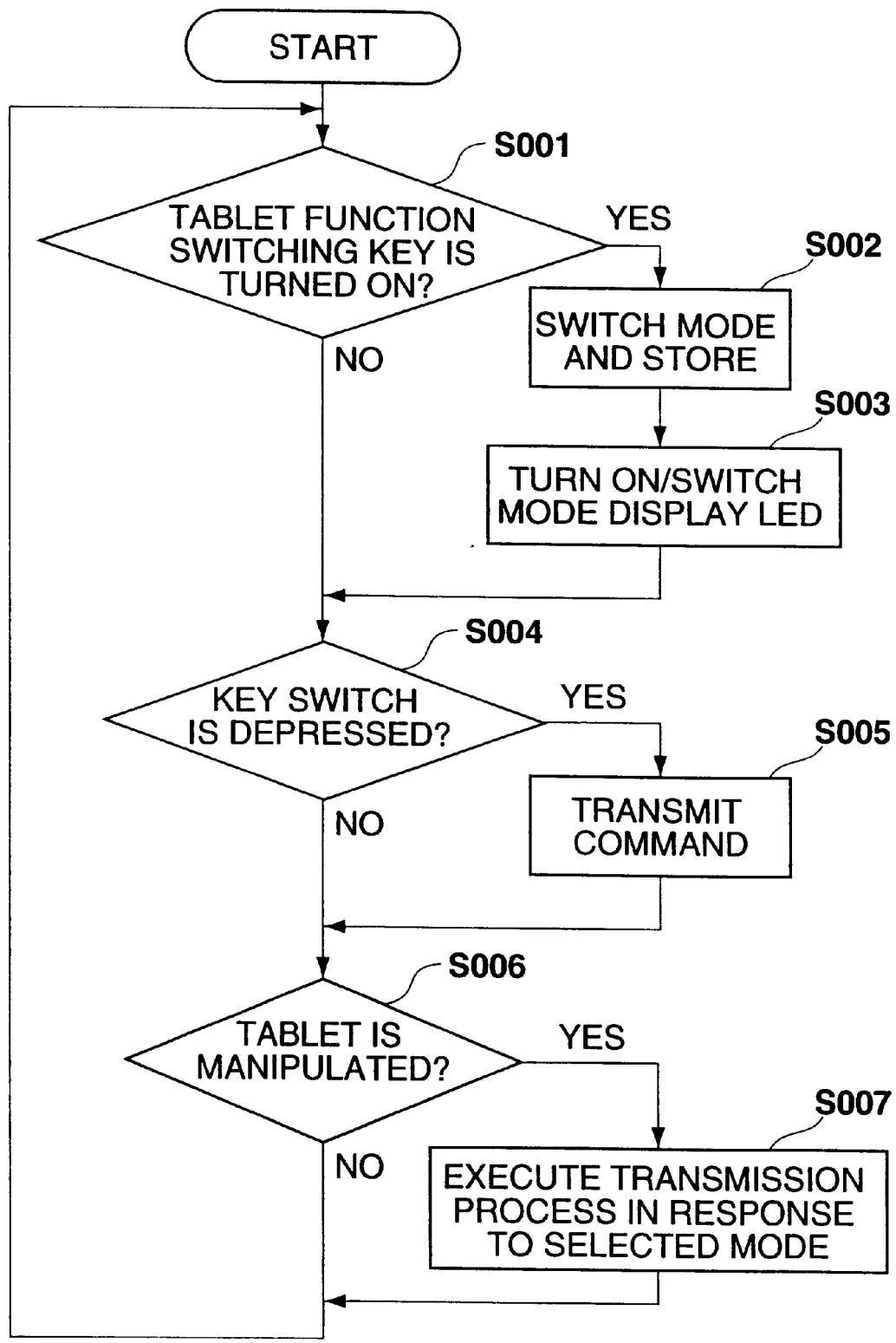
FIG. 13 is a flow chart for describing various operations executed by the remote control apparatus according to this embodiment.

FIG. 13 is a flow chart for explaining process operations repeatedly performed in the control unit 44 of the remote control apparatus 14.

First, when any operation is made for the remote control apparatus 14, the control unit 44 detects as to whether or not the tablet function <switching key 125 is manipulated (S001). When the control unit 44 detects that the tablet function switching key 125 is manipulated, the control unit 44 switches the mode and then stores therein the switched mode. That is, the control unit 44 controls the switch 48 and the switch 66 so as to switch the connections of the switch 48 and the switch 66. Concretely speaking, when the command mode is selected, the control unit 44 controls the switch 48 and the switch 66 in such a manner that the terminal "d" of the switch 48 and the terminal "a" of the switch 66 are connected. Also, the data indicative of the common mode is stored in the RAM 62. When the operation mode is switched to the tablet mode, the control unit 44 controls the switch 48 and the switch 66 in such a manner that the terminal "b" of the switch 48 and the terminal "c" of the switch 66 are connected, and further the data indicative of the tablet mode is stored in the RAM 62 (S002). Then, the control unit 44 turns ON the LED 71 when the operation mode is switched to the command mode, whereas the control unit 44 turns OFF the LED 71 when the operation mode is switched to the tablet mode (S003).

Then, when the control unit 44 detects that the tablet function switching key 125 is not manipulated at the step S001, and when the process operation defined at the step S003 is completed, the control unit 44 detects as to whether any key switch other than the tablet function switching key 125 is manipulated (S004). When the control unit 44 detects that any key switch other than the tablet function switching key 125 is manipulated, the control unit 44 transmits the command in response to the manipulated key switch (S005). In other words, the control unit 44 reads the command corresponding to the manipulated key switch from the ROM 61, and supplies the read command to the adder 69. As a result, the command corresponding to the manipulated key switch is transmitted from the light emitting unit 139.

Then, when the control unit 44 detracts at the step S004 that any key switch other than the tablet function switching key 125 is not manipulated, and when the control unit 44 accomplishes the process operation defined at the step S005, the control unit 44 detects as to whether or not any operation for the tablet 120 is manipulated (S006). This detection can be made by inputting the output of the positional information detecting unit 42 into the control unit 44. When the control unit 44 detects at a step S006 that the manipulation to the tablet 120 is carried out, this control unit 44 executes the transmission process in accordance with the selected mode (S007). Concretely speaking, the control unit 44 causes the data produce unit 46 to execute the data producing process operation in accordance with the mode of the tablet function based upon this tablet function mode stored in the RAM 62, namely the absolute mode, or the relative mode. As a result, either the relative positional information RP or the absolute positional information AP, which is acquired by data-processing the input positional information IP by the data process unit 46 is supplied to the mixer 67. Then, the relative positional information RP or the absolute positional information AP, which has been modulated by the carrier signal in the mixer 67, is transmitted via the switch 66 and the transmitter unit 45 from the light emitting unit 139.

Figure 14:
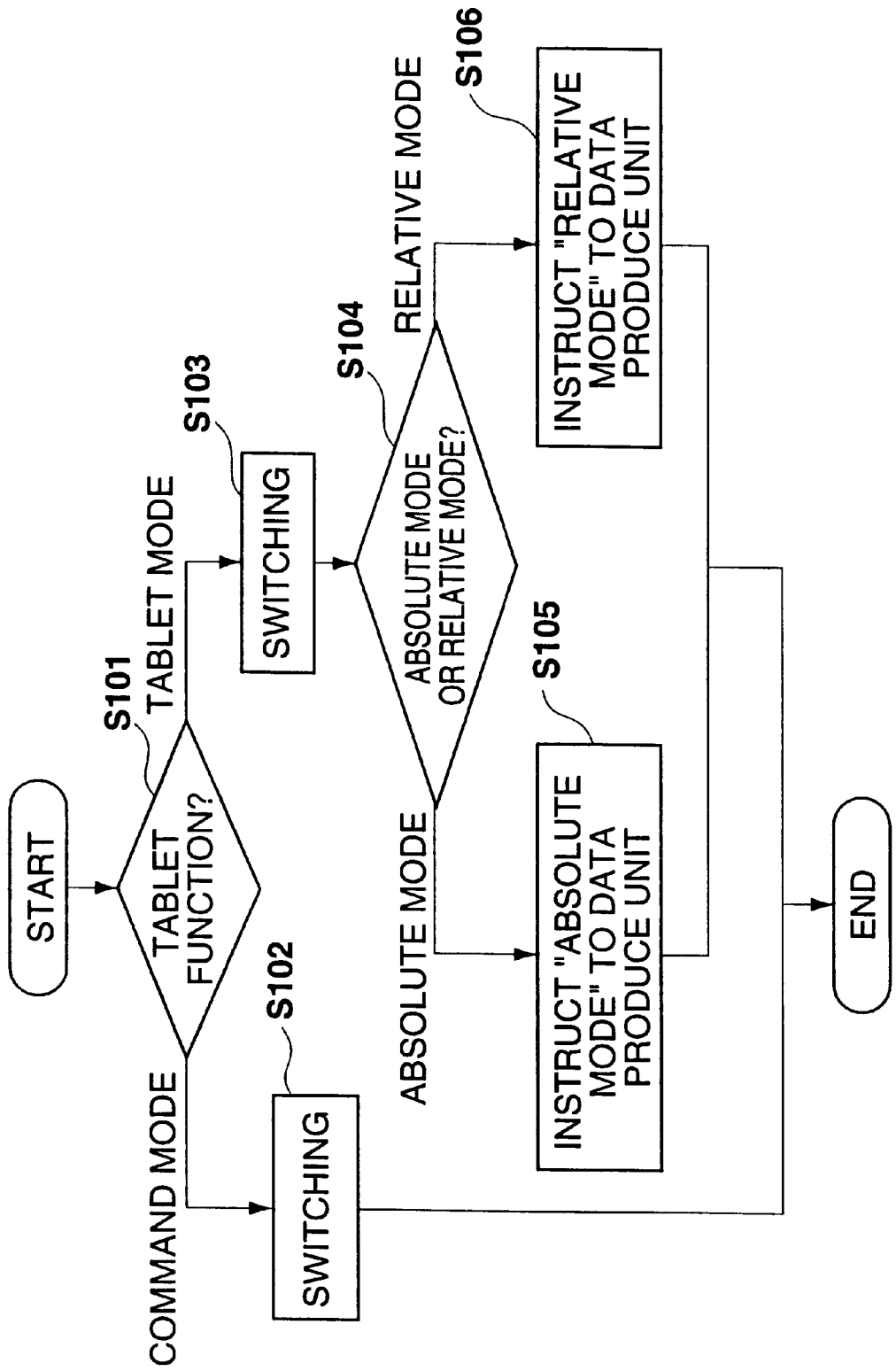
FIG. 14 is a flow chart for describing the mode switching operation for the command mode and the tablet mode by the remote control apparatus according to this embodiment.

FIG. 14 is another flow chart for describing the detailed process operation defined at the step S007 of the flow chart shown in FIG. 13.

First, the control unit 44 judges as to whether the input function of the tablet 120 is either the command mode or the tablet mode (S101). In this step, when the control unit 44 judges that the command mode is selected, the switch 48 is switched to the terminal "a" side (S102) and then the detection signal is supplied as the command information IC to the command converting unit 43. Then, in the comparator circuit 43a of the command converting unit 43, the input detection signal DS is compared with the respective addresses of the command table 43b, so that the command data of the address corresponding to the input detection signal DS is read from the command table 43b. Then, the command data read from the command table 43b is processed in the command produce unit 43c in accordance with such a signal process as adding of error correction codes, and then the processed command data is supplied as the command information IC to the mixer 68. Thereafter, the command information IC modulated on the carrier signal in the mixer 68 is transmitted via the switch 66 and the transmitter unit 45 to the light emitting unit 139.

On the other hand, when the control unit 44 detects at the step S101 that the input function of the tablet 120 is the tablet mode, the switch 48 is switched to the terminal "b" side (S103) and then the input detection signal DS is supplied to the data produce unit 46. Next, the control unit 44 detects as to whether the operation mode corresponds to the absolute mode or the relative mode (S104).

When the control unit 44 detects that the absolute mode is selected, the control unit 44 instructs the data process unit 46 that the absolute mode is selected (S105). Then, in the data process unit 46, such a signal process operation is performed that the error correction code is added to the input detection signal DS. The output from the data process unit 46 is supplied as the absolute positional information AP to the mixer 67. Then, the absolute positional information AP which has been modulated with the carrier signal in the mixer 67 is transmitted via the switch 66 and the transmitter unit 45 from the light emitting unit 139.

When the control unit 44 detects that the relative mode is selected at the step S104, the control unit 44 instructs the data process unit 46 that the relative mode is selected (S106). Then, in the data process unlit 46, the relative positional information is calculated from the input detection signal DS, and such a signal process operation is performed that the error correction code is added to the input detection signal DS. The output from the data process unit 46 is supplied as the relative positional information RP to the mixer 67. Then, the relative positional information RP which has been modulated with the carrier signal in the mixer 67 is transmitted via the switch 66 and the transmitter unit 45 from the light emitting unit 139.

As previously described, as the input mode of the tablet 120, there are provided the command mode for entering the various sorts of commands, the absolute mode, and the relative mode, which constitute the tablet mode for moving the pointer displayed on the CRT 13. For instance, while the user selects the absolute mode or the relative mode, depending upon such facts as, for instance, user's desire, structure of menu screen, and easy operation of application software, the user executes the input operation of the tablet 120. As a result, the user can perform the proper input operations, depending upon usages, resulting in improvements of operability.

Figure 15:
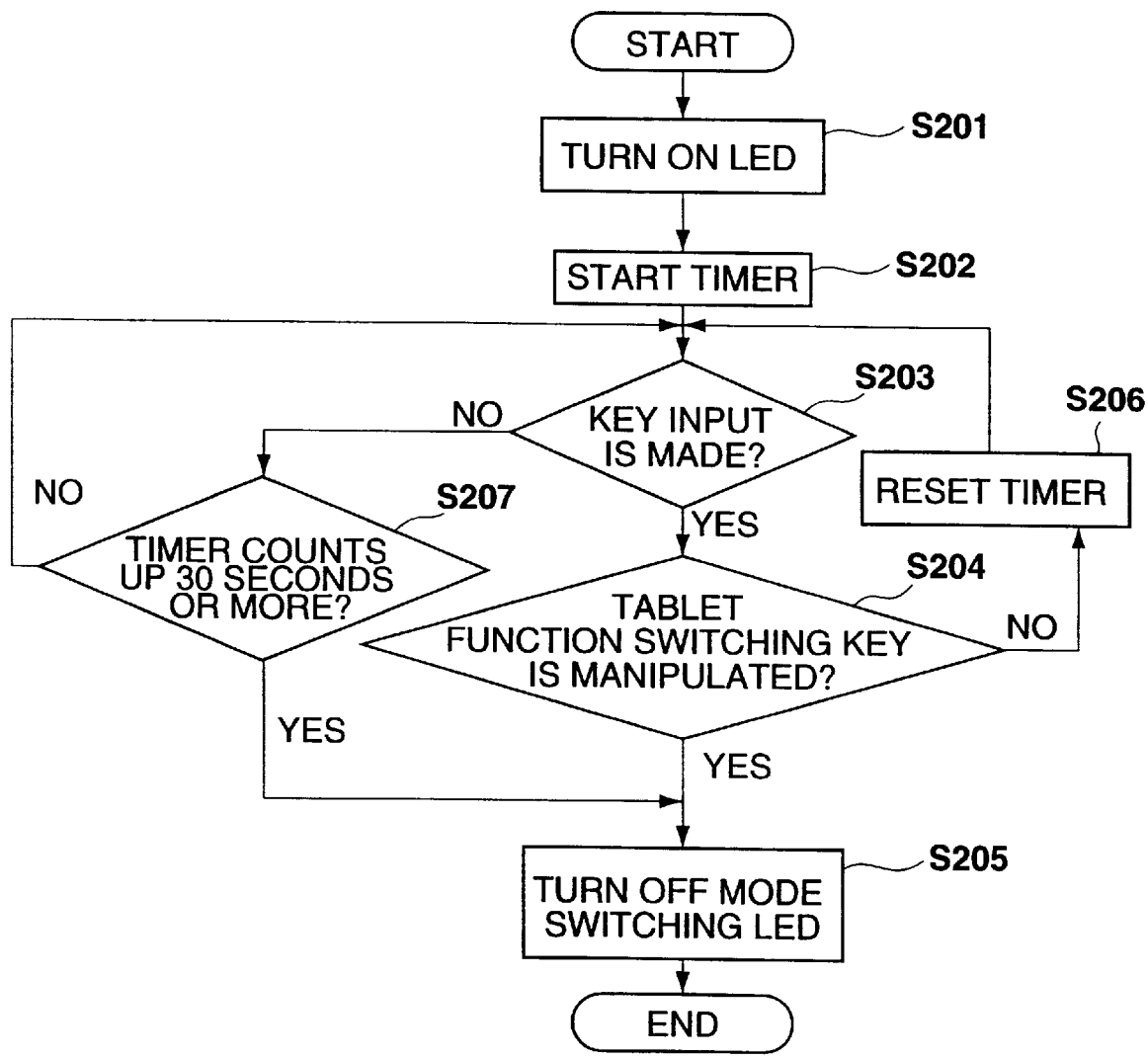
FIG. 15 is a flow chart for describing a case where a tablet function switching key of the remote control apparatus according to this embodiment is lighted up and out.

FIG. 15 is a flow chart for explaining a process operation commenced by the control unit 44 when the input mode of the tablet 120 is switched to the tablet mode. It should be noted in this flow chart that the LED is turned OFF in the tablet mode, and the LED is turned ON in the command mode.

When the input mode of the tablet 120 is switched to the command mode, the control unit 44 commences this process to thereby turn ON the LED 71 (S201). Next, the control unit 44 starts a timer (not shown in detail) built in the control unit (S202). This timer is employed in order to save power consumption in such a manner that the turning-ON operation of the LED 71 is not maintained.

Then, the control unit 44 detects its to whether or not the operation key is inputted (S203). Then, when the control unit detects that the operation key is inputted at the step S203, the control unit 44 judges as to whether or not the inputted operation key corresponds to the tablet function switching key 125 (S204).

Then, when the control unit 44 judges that the tablet function switching key 125 is entered, the control unit 44 switches the input mode of the tablet 120 to the tablet mode, and also turns ON the LED 71, and then accomplishes this process (S205).

When the control unit 44 judges that the tablet function switching key 125 is not entered at the step S204, the count value of the timer is reset (S206).

Also, when the control unit 44 judges at the step S203 that the tablet function switching key 125 is not entered, this control unit 44 detects based on the count value of the timer as to whether or not the time period more than 30 seconds after the input mode of the tablet 120 has been switched to the command mode has passed (S207). Then, when the control unit 44 detects that the count value of the timer is smaller than 30 seconds, the process operation is returned to the step S203, whereas when the control unit 44 detects that the count value of the timer is larger than, or equal to 30 seconds, the process operation is advanced to the step S203.

As a consequence, in the case that the operation key is not inputted after the command mode has been set, namely 30 seconds have passed after the LED 71 is turned ON, the control unit 44 turns OFF the LED 71 so as to prevent the useless power consumption.

Since there are many possibilities that the tablet mode is frequently used as the operation mode, in such a case, the remote control apparatus 14 is automatically brought into the waiting condition in the tablet mode. As a consequence, the user operability can be improved.

As previously explained, since the tablet 120 is commonly used as the pointer moving key and the command inputting key, a total number of operation keys required in the remote control apparatus 14 can be reduced, so that the operation unit of this remote control apparatus 14 can be made simple. As a result, there is no longer required to select a desirable operation from a large number of operation keys, resulting in improvements of the operability.

It should be understood that although the various sorts of marks have been made on the tablet 120 in the usual printing manner in the above-described embodiment, these marks may be printed thereon by using, for instance, fluorescent paint, so that this tablet 120 may be easily manipulated even in a dark room. Alternatively, this tablet 120 may be constituted by using, for example, a touch panel with employment of a liquid crystal display device, so that several sorts of marks may be selectively displayed by switching the drive operation of the liquid crystal display in the operation mode. In this case, even when an input is made in the same tablet area, the command signal read from the command table 43b is selected in response to the mark under display, so that a total number of inputtable commands may be increased by the tablet 120.

Alternatively, a so-called "back illuminating light" is provided with the above-described liquid display device, so that visibility of the marks can be increased.

As previously described in detail, in accordance with the present invention, as the input functions of the tablet of the remote control apparatus, there are provided the command mode capable of outputting the command in response to the input area, and the tablet mode capable of moving the pointer in response to the input position.

As a consequence, the functions of other operation keys provided on this tablet can be commonly realized in this tablet, so that a total number of operation keys provided on the operation unit can be reduced, and therefore the remote control apparatus can be made compact.

What is claimed is:

1. A remote control apparatus comprising:

a main body having only power on/off, menu, text, and control switches arranged thereon;

a tablet arranged on a first major surface side of said main body for inputting command information and positional information using a thumb of a user, said tablet having a plurality of command input marks thereon including channel select, volume up/down, display mode, and input select for exclusively controlling a video monitor by applying pressure to said command input marks to output commands for controlling said video monitor; and a determining click key arranged on a second major surface side of said main body facing in an opposite direction from said first major surface side for determining a selected item at a receiving unit based upon said positional information inputted via said tablet.

2. The remote control apparatus as claimed in claim 1, wherein:

a front concave portion for gripping by the user is formed at a front position on said second major surface side of said main body at an angle relative to said first major surface side;

a rear concave portion formed in a substantially semi-circular shape for gripping by said user is formed at a rear position on said second major surface side of said main body;

said determining click key is arranged at said front concave portion; and a battery lid is detachably arranged adjacent said rear concave portion for gripping by said user when removing said battery lid and located on said second major surface side of said main body for covering a power source battery stored inside said main body.

3. The remote control apparatus as claimed in claim 1, further comprising:

a canceling click key for canceling said selected item determined by said determining click key, said determining click key and said canceling click key being arranged close to each other on a front concave portion at said second major surface side of said main body for ensuring rapid switching, by a finger of a user, between said canceling click key and said determining click key.

4. The remote control apparatus as claimed in claim 1, wherein said second major surface side of said main body is made so as to have a substantially ship-bottom shape in cross-section, such that a lower surface side of said second major surface side of said main body is gradually narrowed away from said first major surface side of said main body.

* * * * *